United States Patent [19]

Francini

[11] 4,080,659
[45] Mar. 21, 1978

[54] MULTI-MODE FILE STORAGE CALCULATOR

[76] Inventor: Joseph P. Francini, 5548 Green Ridge Rd., Castro Valley, Calif. 94546

[21] Appl. No.: 772,488

[22] Filed: Feb. 28, 1977

[51] Int. Cl.² ............... G06F 7/38; G06F 15/02; G06F 15/30
[52] U.S. Cl. .................. 364/715; 364/200; 364/518; 364/736
[58] Field of Search .............. 235/152, 156, 92 SB

[56] References Cited

U.S. PATENT DOCUMENTS

| 3,610,902 | 10/1971 | Rahenkamp et al. | 235/152 |
| 3,906,457 | 9/1975 | Mattedi et al. | 340/172.5 |

*Primary Examiner*—Jerry Smith
*Attorney, Agent, or Firm*—Phillips, Moore, Weissenberger, Lempio & Majestic

[57] ABSTRACT

A multi-mode calculator apparatus is provided including microprocessor means controlled by a control program contained in read only memory means, random access memory means, a keyboard unit, mode selection means and a display unit. In one mode, the calculator apparatus provides for selectively storing data and for updating data already stored in a plurality of permanent storage registers organized in one or more file blocks. In a second mode, step by step processing of the stored data under microprocessor control is enabled including step by step line indication means for guiding the calculator user through the filling out of complex forms. A third mode enables erasure of a file as a block and for transfer of the contents of one file to another again as a block. A standard calculation mode for simple arithmetic calculations may also be provided. The apparatus includes a replaceable programming assembly, enabling different operations to be performed by the control program as a function of the given programming assembly presently installed in the apparatus.

17 Claims, 13 Drawing Figures

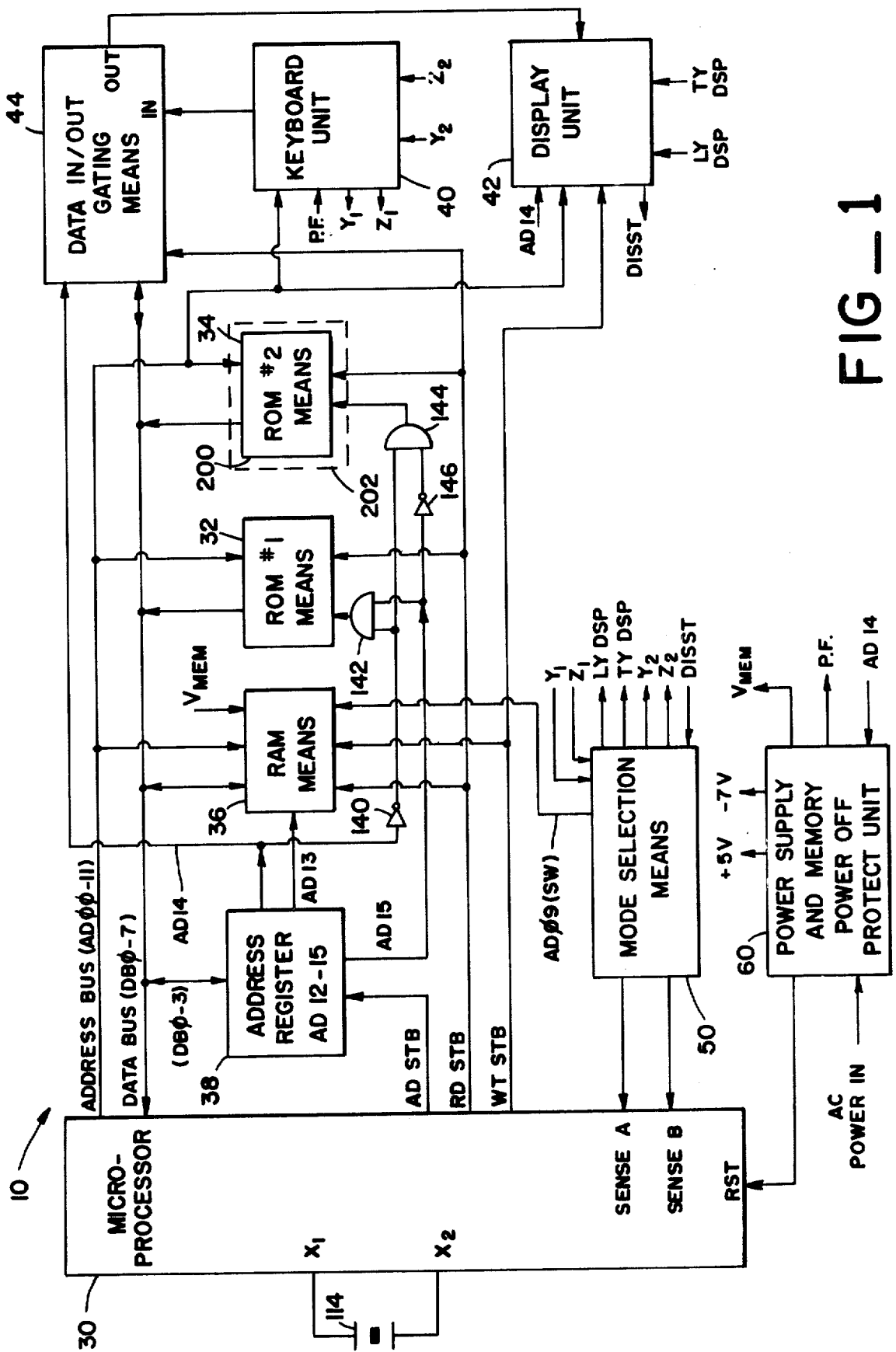
FIG_1

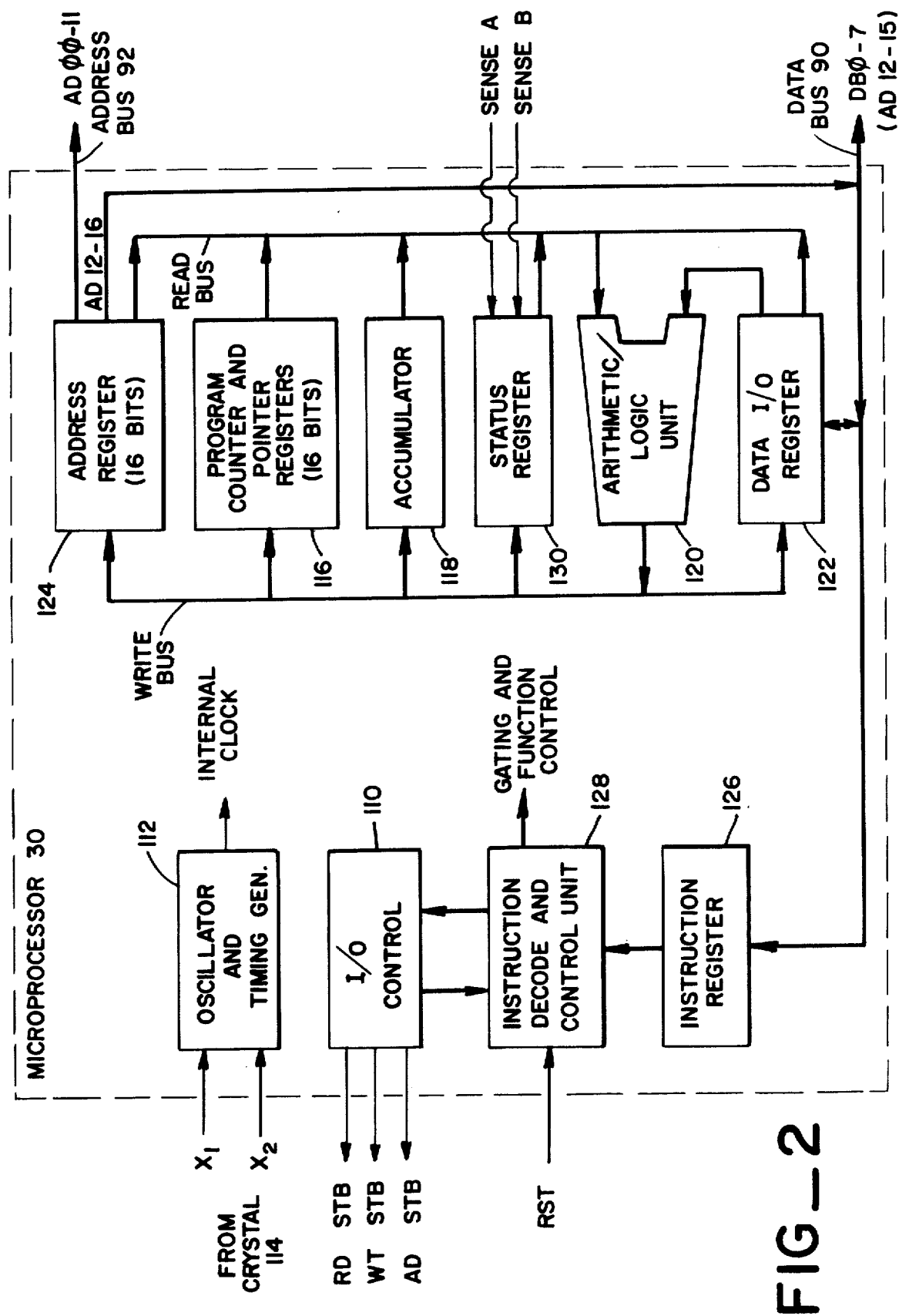
FIG_2

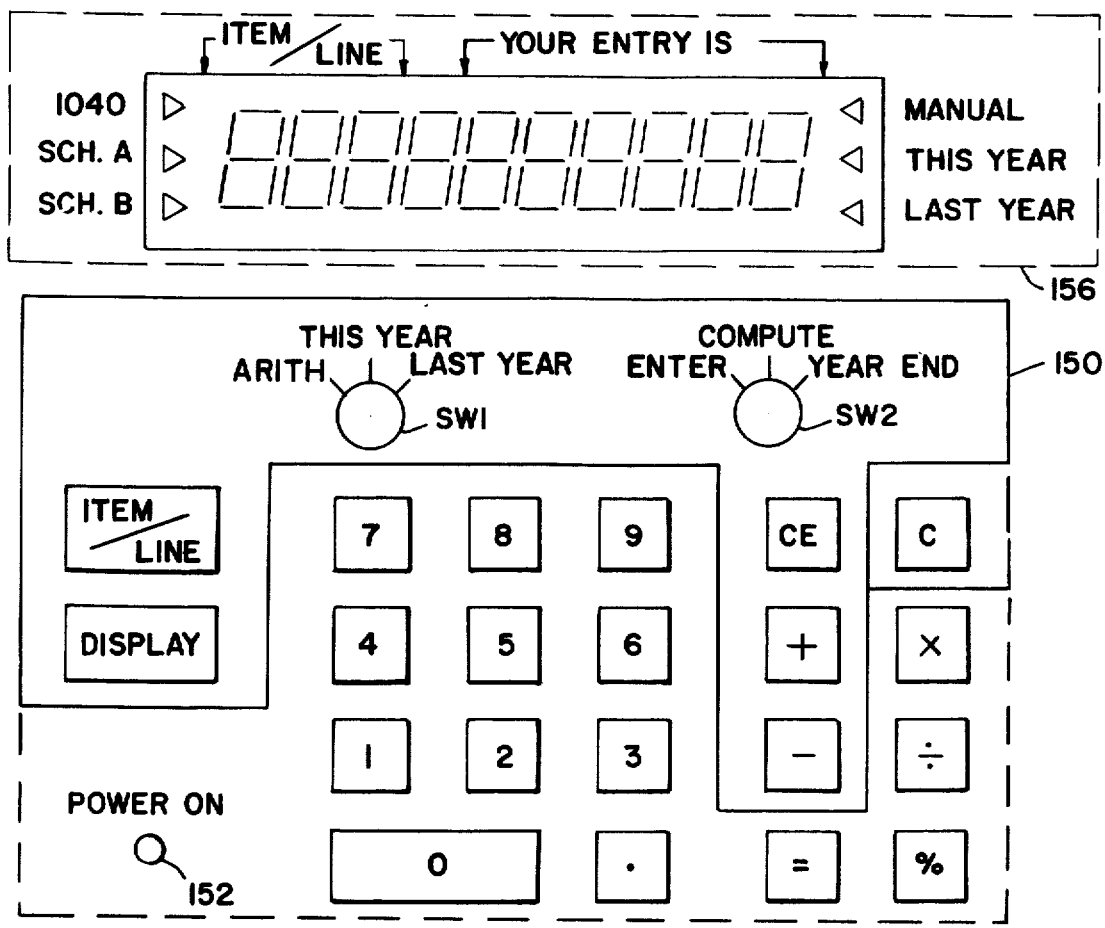
FIG_3
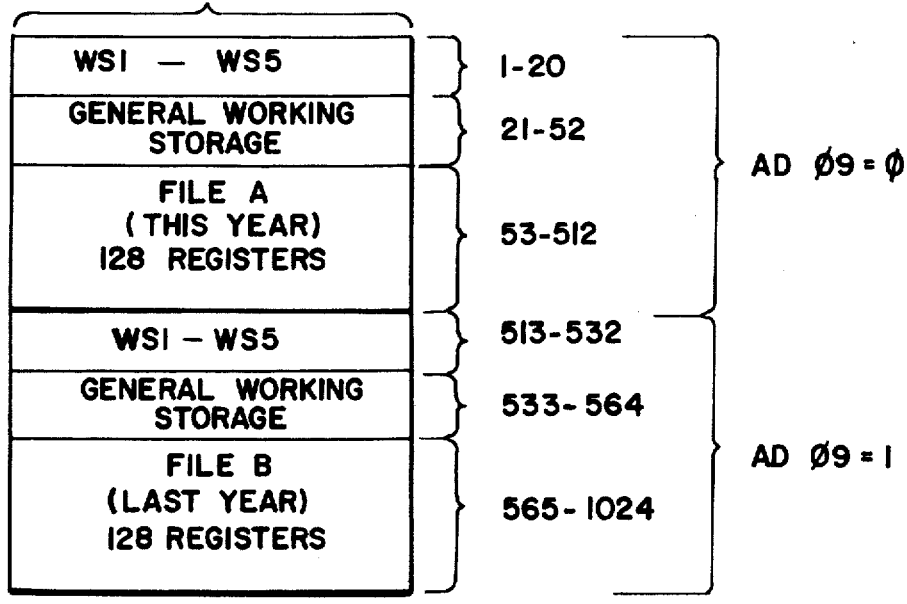
FIG_7

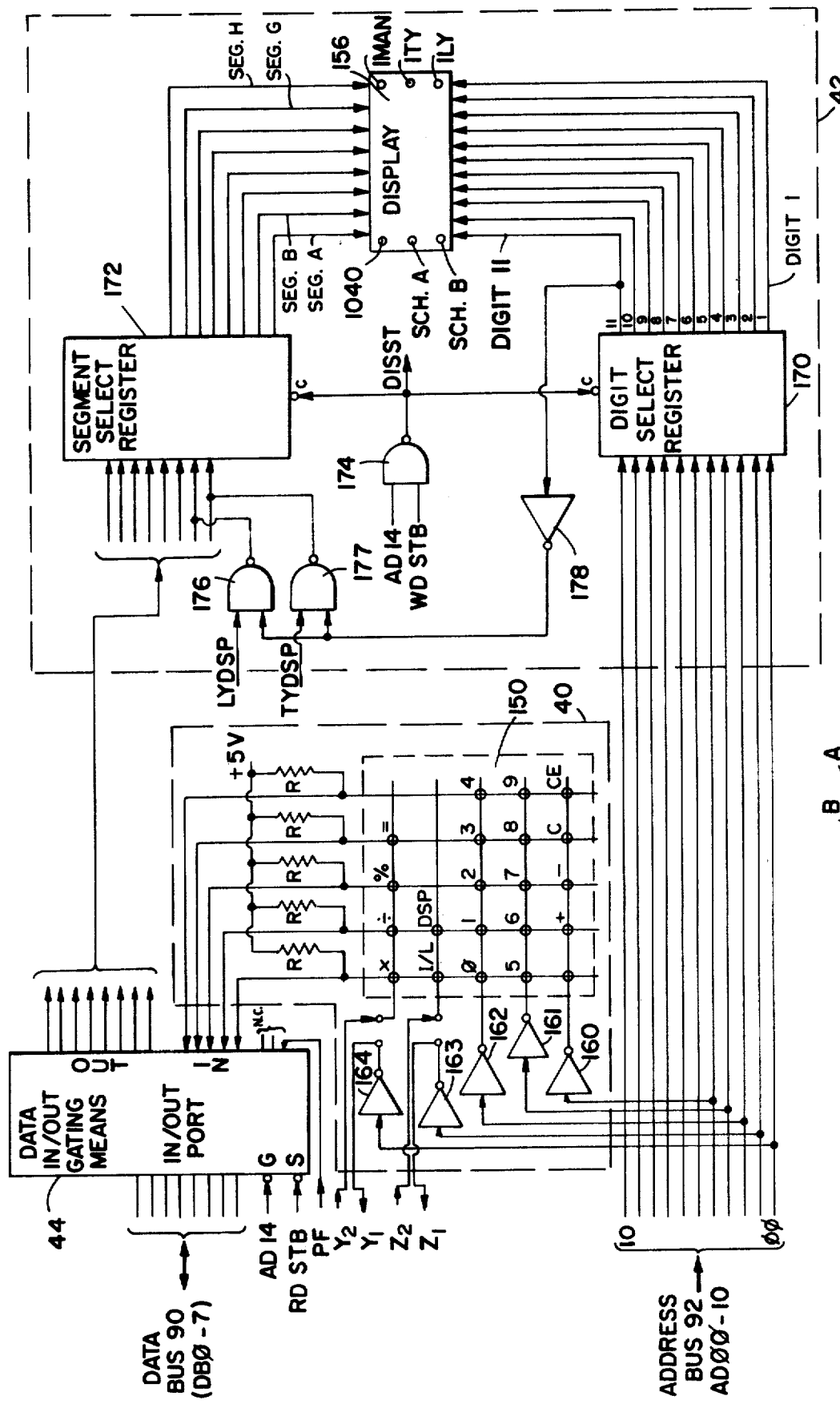

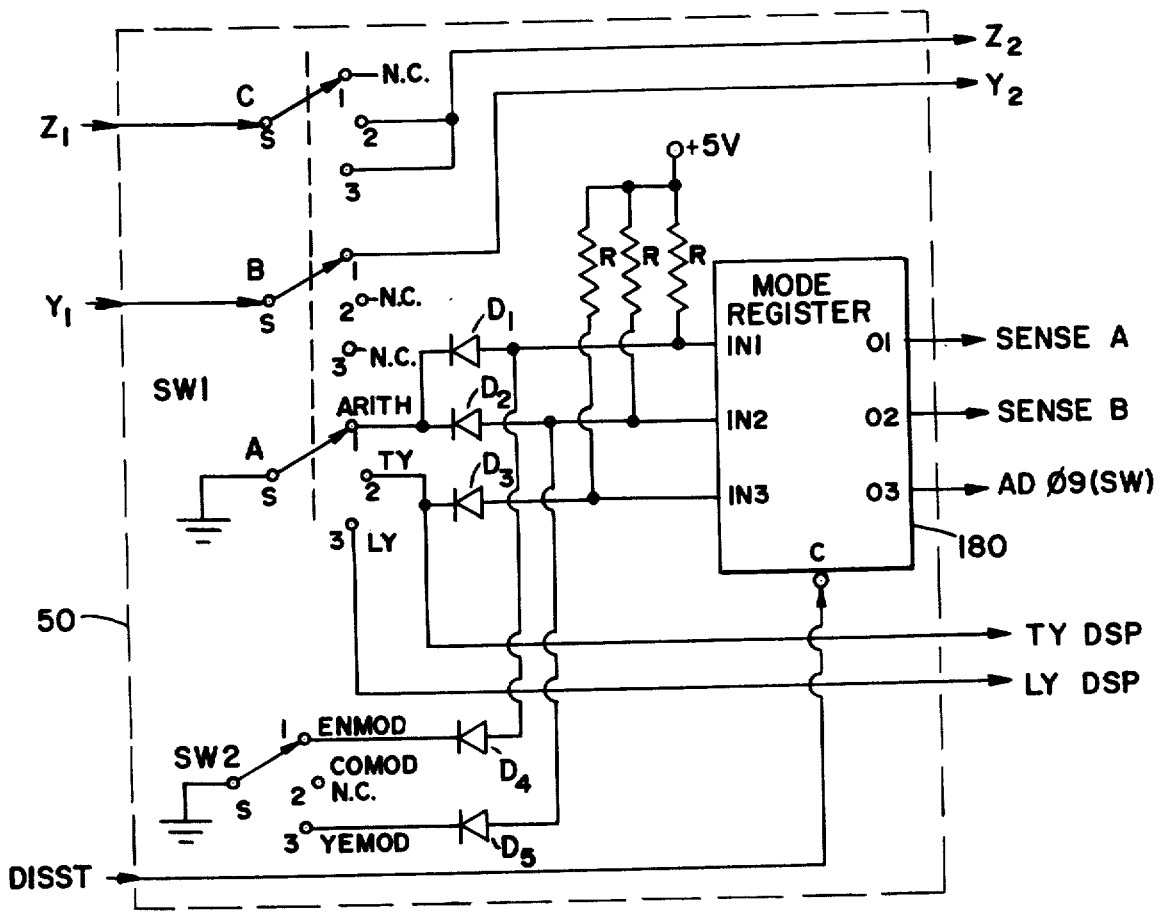
FIG_5
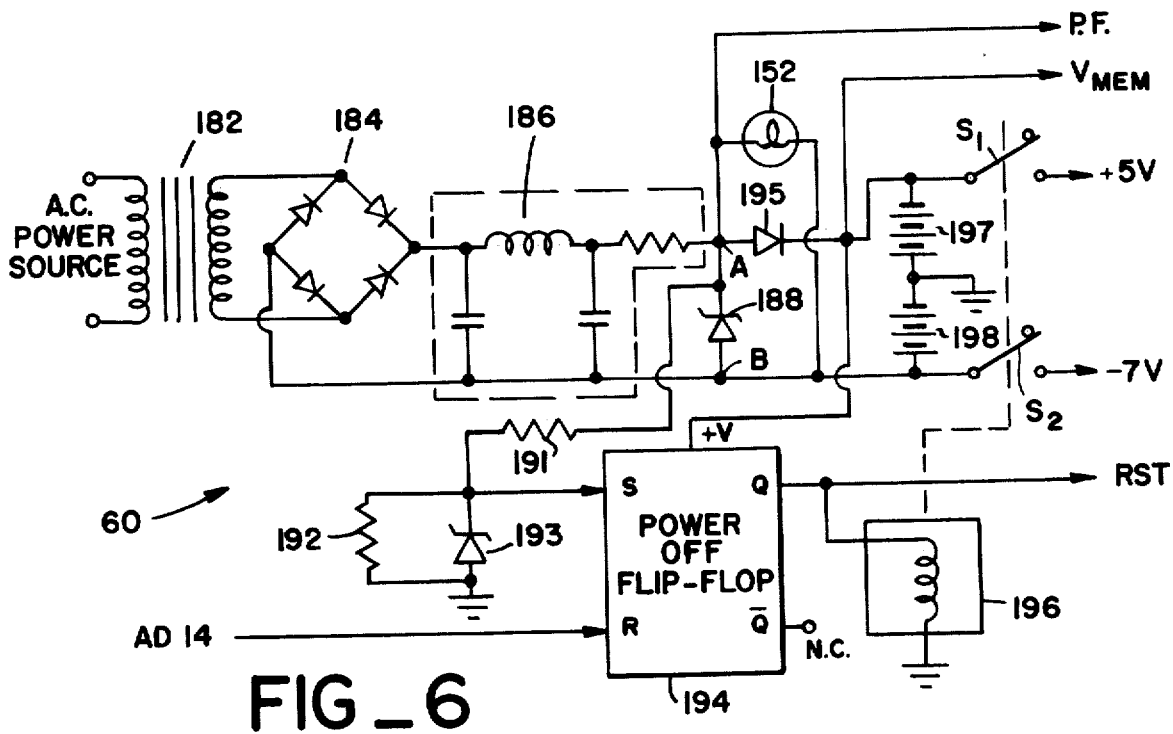
FIG_6

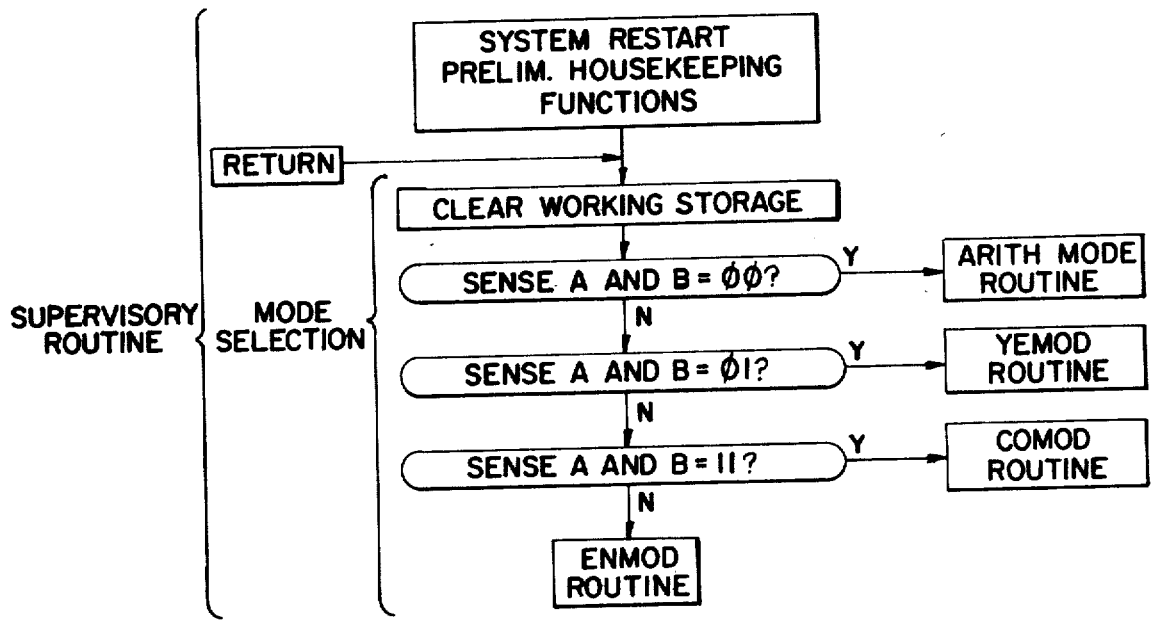
FIG_8A
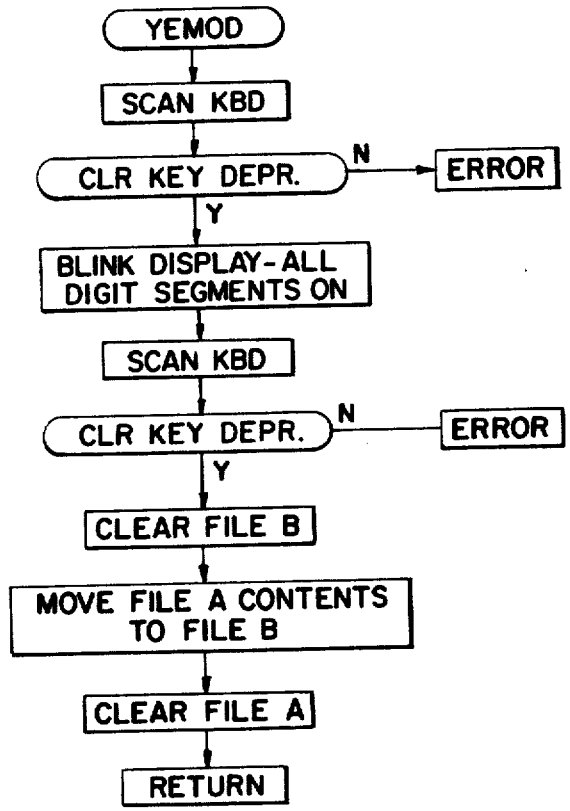
FIG_8C

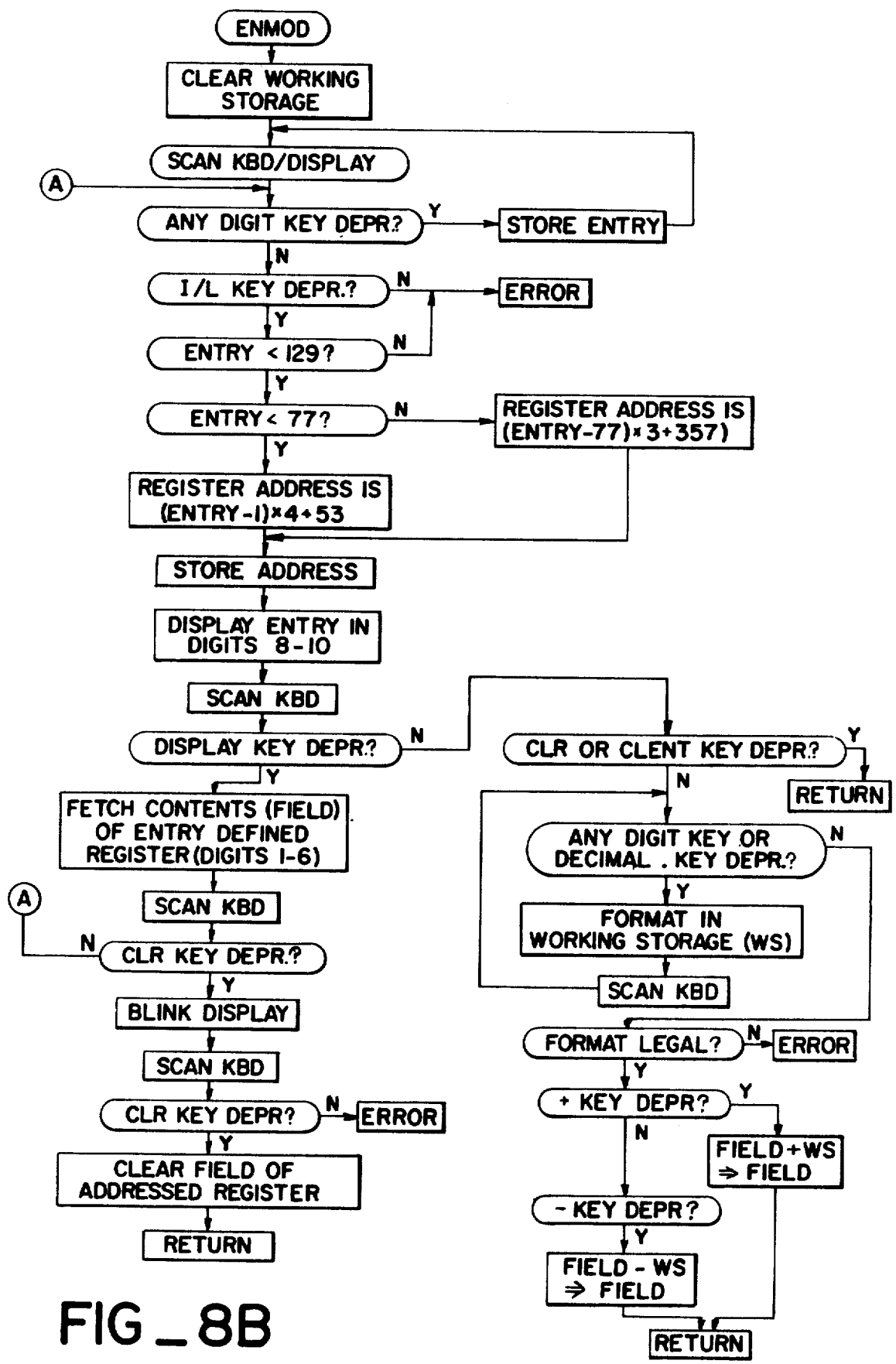
FIG_8B

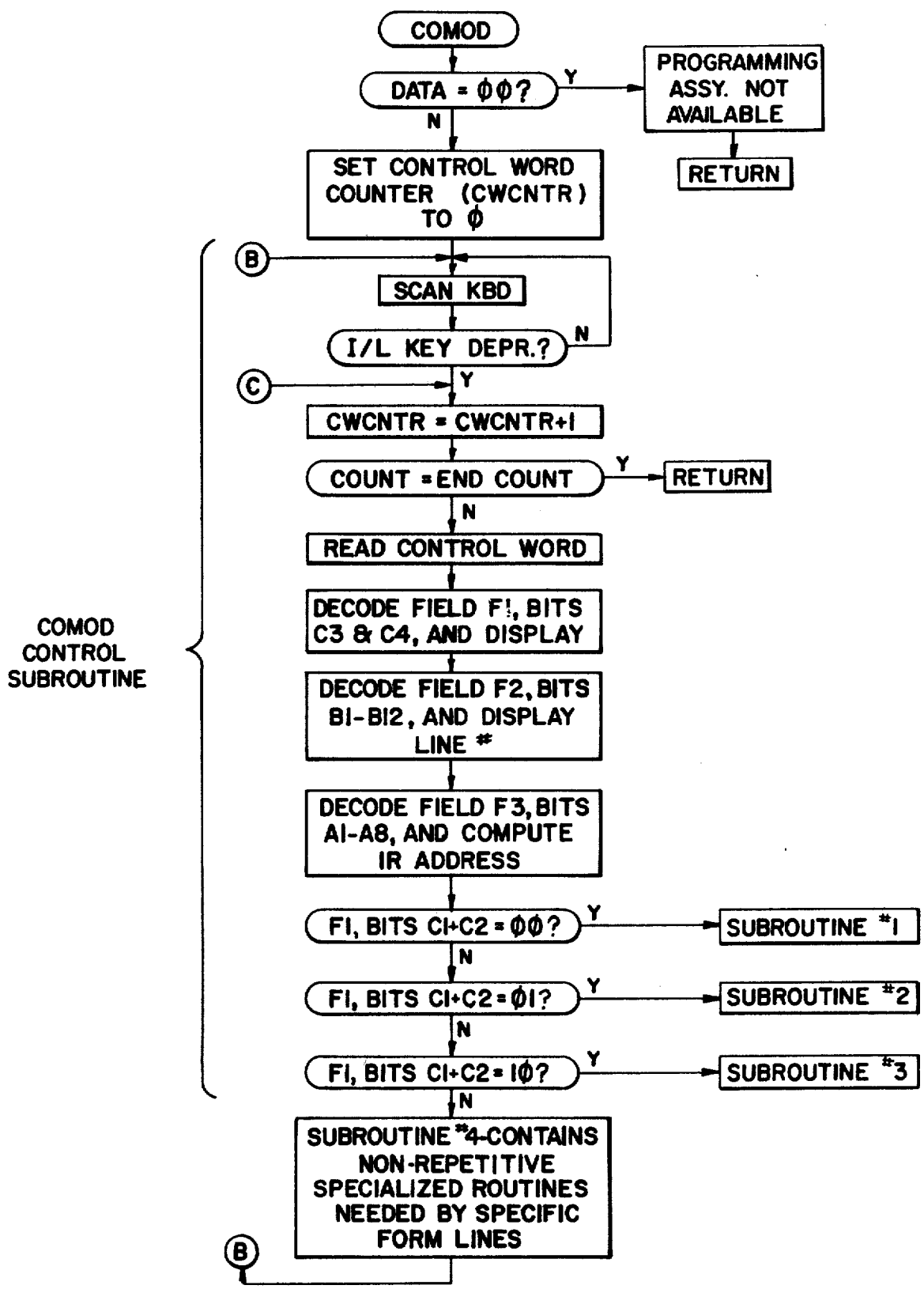
FIG_8D

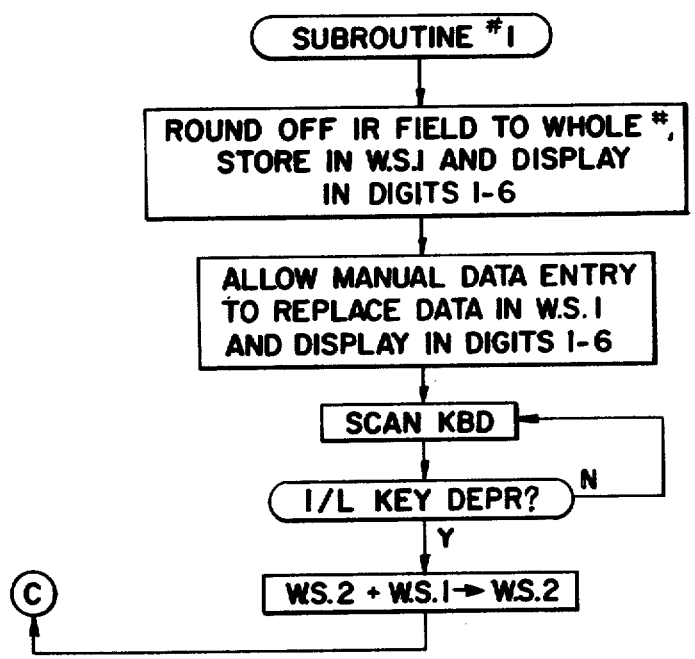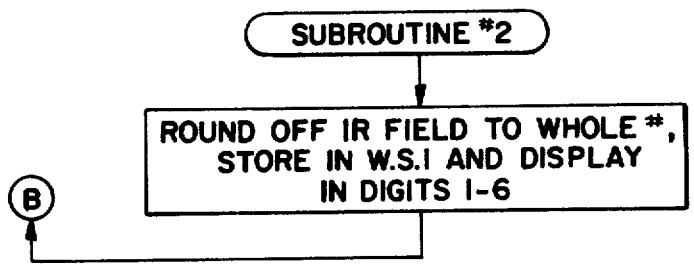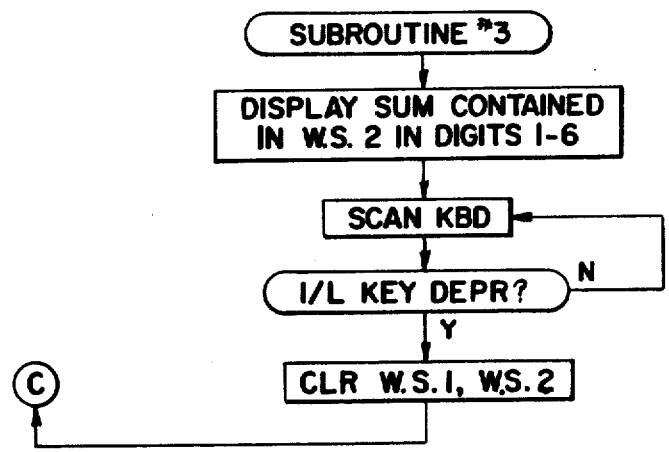
FIG_8E

MULTI-MODE FILE STORAGE CALCULATOR

BACKGROUND OF THE INVENTION

Prior art microprocessors controlled by a control program have recently been used for data entry terminals, retail sales transaction terminals, general calculators and the like. Normally, most such units have been tied to large central computers for the storage of data, e.g., for inventory control, for credit verification, etc. However, none of the prior art terminals or calculators have provided the ability for step by step enabling of the filling out of forms including the calculations associated with each step on the form. Nor have such systems provided means for updating certain portions of the control program associated with calculator operation such that as the required steps associated with each form changes, the apparatus can also be changed to accommodate them.

SUMMARY OF THE INVENTION

The present invention provides a multi-mode calculator apparatus including a microprocessor, a random access memory, two separate read only memories, one of which is designed to be a replacable programming assembly, a keyboard including standard numerical digit and function keys, and a display unit including means for indicating item or line information to the calculator user. The calculator is designed to enable the storage of data over prolonged periods of time and for the subsequent use of the data by the user in filling out of forms. The user is guided through each item and line on a given form or forms, enabling forms having complex calculations to be completed simply and easily. The display unit includes means for identifying which form is currently being operated on, as well as other calculator operational indicators. In the preferred embodiment, the apparatus of the present invention is designed to facilitate the filling out of the Federal personal income tax 1040 form and the associated Schedule A and B forms. The calculator apparatus provides for two data entry and storage modes, one for entering data into the file of item storage registers designed to contain the tax information for transactions in the present year, and a second file designed to contain tax data for transactions that occurred in the preceding year. Another mode of the calculator apparatus is wherein the data contained in either the preceding or last-year file or the present or this-year file is used by the calculator apparatus under control of the microprocessor and read only memory, to automatically calculate and output data as required by the Form 1040 and Schedule A and B forms, using the stored data element of the given file. The number of each line that is currently being calculated is identified to the user on the display unit, along with which form is currently being operated on. Thus, the user need only copy down the data amount indicated on the display, onto the line of the form corresponding to the line number shown on the display adjacent to the amount indication. To continue on to the next line, the user need merely press the item/line switch on the keyboard. Another mode of the calculator apparatus is the year-end mode, wherein, in the case of a calculator having only two file storage areas, the information in the last-year file is erased, the information in the present or this-year file is transferred automatically to the last-year file. Finally, the this-year file is then erased to enable new information from the upcoming year to be inputted thereto.

Therefore a principal object of the present invention is to provide a microprocessor controlled multi-mode calculator for enabling the calculation of both standard arithmetic and to provide the user with a permanent record, including running totals, of various tax related data, e.g., tax deductible expenses, as well as providing the user with step by step guidance in the preparation of the relevant tax forms.

Another object of the present invention is to provide a means for enabling the apparatus to be modified by replacement of a programming assembly such that the apparatus is enabled to be updated with new information regarding changes each year in the form or forms, and to enable different types of forms to be operated on by the apparatus.

A further object of the present invention is to provide an apparatus wherein the storage registers needed to retain data throughout the year are protected from loss of power by means of a power off protect unit.

Still another object of the present invention is to provide a system that takes advantage of the reliability, compactness, versatility, and inexpensiveness, of state-of-the-art microcircuits.

BRIEF DESCRIPTION OF THE DRAWINGS

These and other objects and advantages of the present invention will become more apparent upon reference to the following description and the accompanying drawings in which:

FIG. 1 is a block diagram and partial schematic of a multi-mode calculator apparatus according to the present invention;

FIG. 2 is a simplified block diagram of the microprocessor shown in FIG. 1;

FIG. 3 illustrates an embodiment of the keyboard and display panel for the keyboard and display units shown in FIG. 1;

FIG. 4 is a schematic of the keyboard and display units shown in FIG. 1;

FIG. 4A illustrates the relationship between the symbolism used to show switch functioning in FIG. 4 and a more conventional switch representation.

FIG. 5 is a schematic of the mode selection means shown in FIG. 1;

FIG. 6 is a schematic of the power supply and memory power off protect unit shown in FIG. 1;

FIG. 7 illustrates a typical memory map for the RAM shown in FIG. 1.;

FIGS. 8A–8E illustrates in flow chart form the control program operation of the present invention.

DESCRIPTION OF THE PREFERRED EMBODIMENT

A block diagram and partial schematic of the hardware components of the multi-mode calculator is shown in FIG. 1. The multi-mode calculator 10 consists of a microprocessor 30 controlled by a control program stored in two non-destructive read only memories (ROM's) identified as ROM No. 1 at 32 and ROM NO. 2 at 34. The calculator 10 also includes a random access memory means (RAM) at 36 which provides a plurality of storage registers for storing data to be retained by the calculator, and further including storage areas used by the microprocessor 30 and control program as temporary working storage during various calculations. Further details of RAM 36 organization will be given hereinbelow.

Interaction between a user and the calculator 10 is provided by means of a keyboard unit 40 and a display unit 42. Information is either inputted from the keyboard unit or outputted to the display unit, under control of the microprocessor 30 and control program, by means of a data in/out gating means 44. A mode selection means 50 provides means for selectively enabling one of a plurality of calculator 10 operating modes to be manually chosen by the calculator 10 user. Finally, the calculator 10 includes a power supply and memory power off protect unit 60 for enabling power to be continuously fed to the RAM 36, and also continuously fed to the rest of the calculator 10 if the calculator is in a mode temporarily requiring further processing. After this processing is completed, the calculator 10 automatically shuts off power to all units except the RAM 36. Thus, the memory power off protect unit 60 insures that data stored in the storage registers of the RAM 36 is not lost as a result of such a power failure.

Before going more fully into how these various units operate and interact with one another, a brief description of the main hardware elements of the calculator 10 is given below, so that subsequent discussion of the operation of the present embodiment of this invention will be more fully understood.

A. THE MICROPROCESSOR

The microprocessor 30 is the main manipulator of data and the controller or supervisor of most aspects of the calculator 10 apparatus. A typical type of microprocessor is the National Semiconductor ISP-8A/500D single chip microprocessor. This 8 bit microprocessor was selected simply because of its inexpensive cost and simplicity of operation. Other similar devices, such as the Signetics 2650, or the Intel 8080A, as well as 4 bit devices, such as the Rockwell PPS-4, may be used for this application. For detailed information on the National Semiconductor microprocessor, reference is suggested to their publication number 420305227-001A, dated July 1976.

Referring now to FIG. 2, this figure illustrates a simplified block diagram of the microprocessor 30. Data is communicated to or from the microprocessor 30 over 8 bidirectional lines on a data bus 90. This is an 8 bit data bus having lines identified as DB$\phi$-7. Address information is outputted by the microprocessor 30 over an address bus 92. The National Semiconductor microprocessor enables 12 bits of addressing to be outputted on this bus 92, identified as lines AD$\phi\phi$-11, and further provides time multiplexing of the data bus 90 so that 4 additional bits of addressing information can be outputted also on the data bus 90. These additional address lines are identified as AD12-15. this enables a maximum of 65 K words to be addressed by the microprocessor 30. Separate strobe outputs from the microprocessor 30 indicate when valid address information is present on the buses 90, 92, and when valid input/output memory or peripheral data are present on the 8 bit data bus 90. These output strobes include the address strobe output (AD STB), the read strobe output (RD STB) and the write strobe output (WR STB). These strobes are generated internally in the microprocessor 30 in an input-/output control 110. All three strobes are active low strobes. When the AD STB is low, it indicates that a valid address is present on the system buses. On the trailing edge of a RD STB low pulse, data is inputted to the microprocessor 30 from the data bus 90. When the WR STB strobe is low, it indicates that valid output data from the microprocessor 30 is present on the data bus 90.

Referring now to specific components of the microprocessor 30, an oscillator and timing generator 112 provides all necessary timing signals for the microprocessor 30 operation. The frequency of the oscillator, in turn, is selected by an attached external crystal 114 shown in FIG. 1. The resulting frequency of the oscillator 112 is equal to the resonant frequency of the crystal 114.

A program counter and pointer registers are provided as shown at 116, with the program counter being a 16 bit register that contains the address of the present instruction being executed. The contents of this register are automatically incremented by one just before each instruction is fetched from one of the read only memories 32, 34 to enable sequential execution of the stored instructions. Under program control, the contents of this register may also be modified or exchanged with the contents of a pointer register to effect subroutine calls and program branches. The pointer registers are also 16 bit registers that are loaded normally under program control with reference addresses that serve as page pointers, stack pointers and subroutine pointers. The accumulator 118 is used for performing and storing the results of arithmetic and logic operations as well as for data transfers, logic shifts, etc. With the program counter and pointer registers 116.

The arithmetic and logic unit (ALU) 120 provides the data manipulation capability for the microprocessor 30. This unit 120 provides for operations including increment, decrement, binary addition, OR logic functions, etc. The data input/output (I/O) register 122 is used for temporary storage of all input/output data received via or transmitted over the data bus 90. The address register 124 is used for temporary storage of the 16 bit address transmitted during an input/output cycle.

The operation of the microprocessor 30 consists of repeatedly accessing or fetching instructions from the program stored in the external ROM's 32, 34 and executing the operations specified by these instructions. Each of the instructions is inputted off of the data bus 90 into an instruction register 126 which is loaded during the fetch phase of each instruction cycle. Then the instruction decode and control unit 128 acts on this instruction to generate the various required gating and function control signals needed by the microprocessor 30 to execute the instruction and perform the data processing. Communication between the various internal registers of the microprocessor 30 is provided via an internal write bus and an internal read bus as shown in FIG. 2. Finally, a status register 130 is used in the present invention to provide temporary storage of data coming in on the sense A and the sense B lines used as designated sense condition inputs. As will be described in more detail hereinbelow, these sense lines are used to indicate to the microprocessor 30 what the calculator 10 user has presently selected to be the present calculator 10 operating mode.

The microprocessor 30 is initialized when power is turned on by means of the reset line (RST) inputted to the instruction decode and control unit 128. This reset input is set high to enable normal operation of the microprocessor 30. When power is turned on, as will be described hereinbelow, the RST signal goes high. This causes the instruction decode and control unit 128 to zero all program accessible registers, and then fetch as a first instruction the control program word located in address 0001 in the ROM's 32, 34. Normal execution of the control program is thereby enabled to begin.

B. ADDRESSING THE RAM AND ROMS

Referring again to FIG. 1, shown is an address register 38. This register functions to take the higher order four address bits, lines AD12-15 described above, off of the data bus 90, and to store this address information for the next microprocessor 30 data transfer cycle. Information is strobed off of the data bus 90 to the address register 38 as a function of the AD STB signal. As mentioned above, this strobe is active when a valid address is present on the data bus. After the AD STB signal goes off, the data bus 90 is allowed to be subsequently used for data information transfer.

In the present embodiment, of the four bits of address information inputted to the address register 38, AD-12 is unused, AD-13 selectively enables the RAM 36 to be addressed by the microprocessor 30. Assertion of AD-14 selectively enables the addressing of the data in/out gating means 44 and the display unit 42 by the microprocessor 30, and further provides an inhibit to keep off the ROM's 32, 34. AD-15 enables the microprocessor 30 to selectively address one or the other of the two ROM's 32, 34. As shown in FIG. 1, to act as an inhibit to the ROM's 32, 34, AD-14 is inverted by a gate 140 and then AND'ed with the AD-15 via AND gate 144 to control addressing of ROM 34. The inverse of AD-15 is provided by gate 146.

Therefore, if the microprocessor 30 wishes to address a storage location in the RAM 36, it must first store an address bit corresponding to AD-13 in the address register 38 via the data bus 90 and AD STB strobe. The AD-12, and AD-14-15 lines must be kept unasserted. Then asserting the address bus 92 with the address of the particular storage location desired within the RAM 36, the RAM 36 is then either strobed with a RD STB signal, or a WT STB signal, depending on whether or not the storage location being addressed is to be read out to the microprocessor 30 or written into with data from the microprocessor 30.

Similar to assessing a location in the RAM 36, a storage location in the ROM 32 may be read by the microprocessor 30 by causing the address register 38 to contain an address bit corresponding to the AD-15 location and a lack of an address bit on the AD-14 line to disable its inhibit function, thus enabling AND gate 142 to signal the ROM 32 that it is being accessed. Since the ROM 32 only provides for reading information from a storage location containing permanent information, only the RD STB signal line is inputted to the ROM 32 to control the timing of data output from the ROM onto the data bus 90. ROM 34 is accessed in the same manner as ROM 32, with the only difference being that the addressed bit corresponding to AD-15 is in its opposite state from that required to access ROM 32, to enable thereby AND gate 144 to signal microprocessor 30 selection to the ROM 34.

C. THE KEYBOARD AND DISPLAY

The keyboard and display panel of the present invention is illustrated in FIG. 3. As can be seen, the keyboard 150 includes the standard numerics 0-9 and a decimal point key, and common arithmetic function keys including the plus, minus, clear, clear entry, equal, multiplication, divide, and percent keys. The latter four keys are only operable when the calculator 10 is in the arithmetic operation mode. At all other times, these keys are inactive. The keyboard 150 includes a power on indicator light 152. This indicator 152 remains on as long as primary power is supplied to the calculator 10. Switches SW1 and SW2 constitute a part of the mode selection means 50, and will be discussed along with discussion of those means in a later section of the specification below. The functioning of the item/line switch and the display switch will also be described at that time.

The display of the calculator 10 is illustrated at 156. It includes a conventional 10 digit, 7 segment display unit and 6 dot or arrow shaped indicators located three on each side of the digit portion of the display 156. During arithmetic calculations, all 10 digits in the display 156 are used to display the numbers being generated. As will be described in more detail hereinbelow, when the calculator 10 is in the data entry mode, the first three digits on the left of the display 156 indicate the item number in a hexadecimal format wherein the data is being stored, and the six digits on the right indicate the actual amount being recorded at that storage location. Digit 7 remains blank during this mode. The hexadecimal format enables display of the letters $a$–$f$ in addition to the standard numerics 0–9. During the compute mode, the first three digits on the left of the display 156 indicate the line number of the form currently being operated on, again in a hexadecimal format. The six digits on the right indicate an amount. In this case, the amount displayed is the amount to be transcribed onto the form on the line of the form corresponding to the displayed line number. Again digit 7 remains blank.

The six dot or arrow shaped indicators are meaningful only when the calculator 10 is performing functions relating to the supplied tax information and to the tax computations. The three indicators on the left hand side indicate which of the three forms, the 1040, the Schedule A or the Schedule B form is currently being operated on by the calculator 10. The three indicators on the right hand side include the manual indicator, which is turned on only when the calculator 10 is in the compute mode to indicate when data can be manually entered from the keyboard. This function is needed if the calculator 10 user wishes to have the calculator 10 operate on a different value for a particular amount, e.g., the medical deduction, so then the calculator 10 can operate on the new data in place of the data presently stored in the given associated storage register in the RAM 36. The last two indicators are the this-year indicator and the last-year indicator which indicate which file of data in the RAM 36 is currently being operated on by the calculator 10 in either the data entry mode, or the compute mode.

FIG. 4 illustrates a schematic of the keyboard unit 40 and display unit 42 shown in FIG. 1. Also included in FIG. 4 is a detail of the data in/out gating means 44 shown in FIG. 1. Referring first to the keyboard unit 40, the keyboard 150 includes a plurality of switches with each switch contact point represented by the crosspoint of two perpendicular lines, and a circle drawn at this point. FIG. 4A illustrates the relationship between the above switch symbolism and a more conventional switch representation wherein the switch push button A may be caused to create a conducting path between poles B and C. As can be seen, each of the switches described above as being on the keyboard 150 is shown and is locatable at a specific cross point in FIG. 4. The keyboard 150 is organized in a standard switch matrix fashion, wherein a given one line on the address bus 92 is energized to enable read out of a given switch actuated cross point path. For example, if the numeral 6 switch has been pressed, when the address bus 92 bit φ4 is energized, the row including numerals 5-9 is energized. Since switch 6 is the only switch actuated in that row, a switch path is detected only along the column on which this numeral switch lies. This column line is then fed into the data in/out gating means 44 along with the other column lines from the keyboard 150 matrix. The microprocessor 30 selectively enables the data in/out gating means 44 via address bit AD-14. When a read strobe signal is generated by the microprocessor 30 at the next adjacent data transfer interval of the data bus 90, the bidirectional (in/out) port of the data in/out gating means 44, tied to the data bus 90, thereby reflects the changed state generated by the switch 6 closure. In a similar manner, any of the switches in the keyboard 150 can be selectively accessed by the microprocessor 30. The inverter gates shown along each of the rows of the keyboard 150 matrix, gates 160-164, are used merely to act as individual drivers for their respective switch rows. Note that if address bit AD-14 is asserted, and the read strobe doesn't appear, the data on data bus 90 is coupled by the gating means to its output and thereby to the display unit 42. Further details on the display unit 42 is given below.

The outputs of drivers 163 and 164 are not connected directly to their respective switch rows in the keyboard 150. The output of driver 163 is broken out along line Z1 and connected to the mode selection means 50. An output from the mode selection means 50 is returned along line Z2 to the corresponding switch row in the keyboard 150. Similarly the driver 164 output is coupled to the mode selection means 50 along line Y1, and returned from the mode selection means 50 along line Y2. The operations performed on these lines by the mode selection means 50 will be described below in the mode selection means section of the specification.

Note that resistors are also connected to the keyboard 150, with an individual resistor R tied to each column of the switch matrix. The other end of each resistor is tied in common to + 5 volts. Thus, this resistor organization causes the plurality of columns in the keyboard 150 switch matrix to normally sit with a positive voltage on each column line. When a switch is closed by the calculator 10 user and the corresponding row line is asserted by the specific address bus 92 line and associated driver, the output of the driver goes to a low state to thereby pull to ground the column line which crosses the given switch closure point. This column line signal is coupled to the data in/out gating means 44. As described above, under microprocessor 30 control the gating means 44 subsequently outputs this data onto the data bus 90.

The display unit 42 is also shown in FIG. 4. This display unit 42 includes the 10 digit display 156 and also a digit select register 170 and a segment select register 172. The display 156 is organized such that only one seven segment digit is turned on at any given time. Each digit is accessed and updated in a sequential manner by the microprocessor 30, such that the entire 10 digits and 6 indicators appear to the calculator 10 user to be continuously indicating the current operational data needed by the operator. The digit select register 170, as the name implies, operatively selects which one of the ten digits is currently to be turned on by the microprocessor 30. The digit select register 170 is accessed by the address bus 92. The segment select register 172 is accessed by the data bus 90 via the data in/out gating means 44. This register 172 operates to selectively enable the desired segments in the selected digit to be turned on, to create thereby a given number or letter on the display 156. Both the register 170 and the segment select register 172 are loaded from their respective input buses 90 and 92 by assertion of the AD-14 line by the microprocessor 30 and its subsequent coupling of the write strobe (WD STB) to a NAND gate 174. This gate 174 output is coupled to the clock input of the registers 170, 172. Since data is coupled from the data bus 90, via gating means 44, to the segment select register 172, this WD STB clocks in this information. Recall that the data in/out gating means 44 is in a state wherein the data bus 90 data is coupled directly out to the register 172 when the read strobe (RD STB) is unasserted. As described above, when the RD STB signal is asserted, data is coupled in the opposite direction from the keyboard unit 40 through the data in/out gating means 44 to the data bus 90.

The six indicators on the display 156 are accessed by addressing digit 11, and using the segment select register 172 to energize one or more of the six indicators as if they were segments of the single digit 11. Thus, for example, the this-year indicator light (ITY) would be accessed by energizing the segment B line. Similarly, the last-year indicator light (ILY) would be energized by the segment C line. Note that more then one segment line A-G can be energized also for the addressed digit 11, so that one or more of the six indicators can be turned on at any given time. An eighth line, identified as segment H in FIG. 4, is coupled from the segment select register 172 to the display 156. This line is used to turn on a decimal point in place of a alpha-numeric character, and is used during the arithmetic calculation mode of the calculator 10.

Since only one digit can be accessed at a given time by the microprocessor 30, to simplify the amount of circuits required, no storage means is provided to retain all of the essentially eleven digits of information. Thus, the calculator 10 is required to sequentially access each digit in the display 156 in a periodic fashion, e.g., on the order of a millisecond per digit. Scanning at this fast rate enables the entire display 156 to appear to be continuously on. A display as described above is conventional, with, for example, a Futaba or Noritake display being two types which are usable for the display 156 of the present invention.

The data used to control the energizing of the this-year indicator and the last-year indicator on the display 156 is provided by the mode selection means 50. These indications are coupled to the display unit 42 on the last-year display line (LY DSP) and the this-year display line (TY DSP). Consequently, AND gates 176 and 177 are used to couple these respective signal lines to the corresponding inputs of the segment select register 172 when digit 11 is addressed. As mentioned above, this digit is addressed by the microprocessor 30 when the six display indicators are to be updated. An invertor gate 178 is needed merely to insure the proper levels such that gates 176 and 177 operate as AND function gates.

D. MODE SELECTION MEANS

The mode selection means 50 of the present invention is illustrated in block diagram form in FIG. 1 and in detail in FIG. 5. The mode selection means 50 provides means for selectively enabling one of the plurality of calculator 10 operating modes to be manually chosen by the calculator 10 user. This means 50 includes two manually operatable switches, switch SW1 and switch SW2. As seen in FIG. 5, switch SW1 includes three separate sets of switch contacts, switch portions SW1A, SW1B, and SW1C. Switch SW2 only has the one set of contacts. The swingers S of SW1A and switch SW2 are tied to ground, so that whichever output pole is switchably connected to the swinger in each switch is thereby also tied to ground.

The state of switches SW1A and SW2 is detected by a mode register 180. Thus, one or more of the three inputs to the mode register 180, IN1, IN2 and IN3, selectively coupled to ground as a function of the present state of switches SW1A and SW2. Normally, these inputs are held in a high state by resistors R, which couple each of the register 180 inputs to +5 volts.

The switches SW1 and SW2 are also illustrated in FIG. 3 as being on the keyboard 150. Switch SW1 is shown to have three positions, corresponding to the three poles, 1, 2 and 3 shown in FIG. 5. These positions are ARITH (arithmetic), this-year (TY) and last-year (LY). These designations are also shown in FIG. 5, with switch SW1A pole 1 indicating ARITH, pole 2 indicating TY, and pole 3 indicating LY. Switch SW2 also has 3 positions as seen in FIG. 3, the enter (ENMOD) position, the compute (COMOD) position, and the year-end (YEMOD) position. Again, these positions are also indicated in FIG. 5.

The switch SW1B and switch SW1C switch portions of the switch SW1 provide a conducting path from their respective input swingers to a given output pole as a function of their switch position. Consequently, switch SW1B has a conducting path from Y1 to Y2 only when switch SW1 has a conducting path between the swinger and pole 1. This switch position corresponds to the ARITH position of switch SW1. Referring to FIG. 4, we see that providing a conducting path between Y1 and Y2 enables driver 164 to activate the row of the keyboard 150 switch matrix containing the arithmetic function keys of multiply, divide, percent, and equal. Consequently, when the microprocessor 30 addresses this row, and if one of these function keys is depressed, this condition will be detectable back at the microprocessor 30 via the data bus 90, as described.

However, when switch SW1B is in either of the other 2 pole positions 2 or 3, there is no conducting path between Y1 and Y2, thus disabling the microprocessor 30 from detecting any function key conditions along the row driven by driver 164. Consequently, when the switch SW1 is in either the this-year or the last-year position, none of the four arithmetic function keys are recognized by the calculator 10. As a result, this switch SW1B apparatus acts to relieve the microprocessor 30 control program from memory consuming sort routines.

Similarly, switch SW1C provides a conducting path as a function of switch SW1 position from Z1 to Z2. Again, as shown in FIG. 4, when such a path exists, it enables driver 163 to drive its corresponding row. This row contains the item/line switch (I/L) and the display switch (DSP). As shown in FIG. 5, switch SW1C only enables a conducting path to exist between Z1 and Z2 when switch SW1 is either in the this-year or last-year position. When switch SW1 is in the ARITH position, no conducting path is generated, so that neither the I/L or the DSP switches are recognized by the microprocessor 30 if these keys are pushed when switch 1 is in this position. Depression of either one of these keys is only recognized by the microprocessor 30 when switch SW1 is in the this-year or last-year position. Further operational characteristics of the item/line key and the display key will be given below in the system operation section of the specification.

Referring still to FIG, 5, initially note that when switch SW1A is in this-year position, an output is enabled on line TY DSP, and when the switch SW1A is in the last-year position, an output is enabled along line LY DSP. As described above, these two signals are coupled to the display unit 42 to enable this switch condition to be displayed on the display 156 indicators. The main function of the mode selection means 50, however, is to provide an indication to the microprocessor 30 of the present calculator 10 mode desired by the calculator user. As seen in FIG. 1, the mode register output lines identified as sense A and sense B, are coupled from the mode selection means 50 to the microprocessor 30. The state of these two lines indicates to the microprocessor 30 the present mode desired by the calculator 10 user. Table I illustrates the various states of the two sense lines A and B and what these states are defined to indicate.

There are four possible major modes of operation of the calculator 10. They are: the arithmetic calculation mode (ARITH); the data entry or enter mode (ENMOD); for entering data into a specific category, a specific item register in one of the files A or B; the year end mode (YEMOD) for transferring the contents of one file register into a second file register and then erasing the contents of the first file register; and the data compute and output mode (COMOD) for outputting data and line numbers as a function of predetermined mathematical calculations and the stored data elements in the item registers of the RAM 36. Thus, this output mode enables the filling out of the forms associated with the calculator 10 including the computation of the various line by line data as specifically required by those forms. In the ARITH mode, i.e., when switch SW1A is in the ARITH position, the calculator 10 performs the functions of a standard arithmetic calculator and disregards all other functions. All storage files are inaccessible, and certain keyboard 150 switches and display 156 functions are rendered inoperable.

TABLE I

| MODE | SENSE A | SENSE B |
|------|---------|---------|
| ARITH | 0 | 0 |
| ENMOD | 1 | 0 |
| YEMOD | 0 | 1 |
| COMOD | 1 | 1 |

The mode register 180 reflects the current user mode selection of switch SW1 and switch SW2 as a function of the DISST signal which is coupled to the clock C input of the register 180. Each time the DISST signal occurs, it causes the register 180 to update its contents. With reference to FIG. 2, one sees that the DISST signal is generated by NAND gate 174 when address bit AD 14 has been generated by the microprocessor 30 and a corresponding write strobe signal has been generated. Thus, since the display 156 is updated periodically, e.g., once every millisecond, the mode register 180 is correspondingly also updated at this rate.

To generate the states required by the microprocessor 30 over the sense A and sense B lines, switch SW1A and SW2 are tied together via a diode matrix including diodes D1 through D5, as shown in FIG. 5, with the output of these diodes being tied to the mode register 180. Both diodes D1 and D2 are tied to the ARITH pole, pole 1 of switch SW1A, such that when switch SW1A is in this position, a ground is coupled via D1 and D2 to the mode register 180 inputs IN1 and IN2. Consequently, when the mode register 180 is next updated, the corresponding outputs O1 and O2, i.e., the sense A and the sense B outputs will reflect this ground state and thereby indicate a $\phi\phi$ mode to the microprocessor 30. As seen in table I, the microprocessor 30 will read this as the ARITH mode.

When switch SW1A is not in the pole 1 position, i.e., if it's in the this-year or last-year position, neither D1 nor D2 is activated, and D4 and D5, tied to switch SW2, are enabled. Both these diodes D4 and D5 are also tied respectively to input's IN1 and IN2 of the mode register 180. Thus, if SW1A is not in the ARITH position, and switch SW2 is in the pole 1 position, corresponding to the enter mode, a ground is coupled via diode D4 to input IN1 of the mode register 180. Since the input IN2 is not grounded because neither D2 nor D5 are grounded, the output of mode register 180 resulting therefrom is a $1\phi$ signal. Again, reference to table I shows that the microprocessor 30 will record this as the enter mode. Similarly, if switch SW2 is in the compute mode position, with the swinger coupled to pole 2, none of the diodes D1, D2, D4 or D5 are grounded. In this case, the mode register 180 output on the sense A and sense B lines is a 11. Lastly, when switch SW2 is in the pole 3 position corresponding to the year-end mode only D5 is grounded, thus grounding input IN2 of the mode register 180. This generates an $\phi1$ output state on the sense A and sense B lines to the microprocessor 30.

The third input to the mode register 180, identified as IN3, is controlled by diode D3 to the this-year position of switch SW1A. Diode D3 couples a ground to the mode register 180 when switch SW1 is switched to this position. This circuit is used to provide an indication to the RAM 36, via line AD$\phi$9(SW), of whether the switch SW1A position is on pole 2, the this-year position, or on pole 3, the last-year position.

Line AD$\phi$9(SW) is wire-OR'ed with the corresponding address line AD$\phi$9 from the microprocessor 30 on address bus 92, to provide an automatic means of addressing only a certain portion of the RAM 36 as a function of the switch SW1 state. More on this functioning will be described in the system operation section of the specification.

E. THE POWER SUPPLY AND MEMORY POWER-OFF PROTECT UNIT

The power supply and memory power-off protect unit 60 is illustrated in block diagram form in FIG. 1. A more detailed circuit showing one embodiment of this unit is illustrated in FIG. 6. The basic power supply of the calculator 10 is conventional, in that an AC power source is rectified and filtered to obtain the DC voltages required to operate the various circuits of the calculator 10. Thus, as an example, FIG. 6 illustrates a power supply comprising a step-down transformer 182, a rectifier means 184, a filter means 186, and a zener diode 188. The zener diode 188 is selected such that a voltage drop of 12 volts will normally exist across this diode. The power on indicator light 152 is connected across this diode 188 to provide an indication to the calculator 10 user when AC power is being supplied to the calculator 10.

During normal power supply operation, with a voltage drop present across the zener diode 188, the voltage at point A on one side of the diode 188 is a power supply output voltage. The voltage at point B on the other side of diode 188 constitutes a second power supply output voltage. The voltage at point A is coupled via resistor 191 to the set input S of a flip-flop 194 identified as the power off flip-flop. A resistor 192 and a zener diode 193 insure that the voltage at this input is approximately +5 volts with respect to calculator 10 ground. Power is coupled to the flip-flop 194 from point A via a diode 195. The output of flip-flop 194 is tied to a relay coil 196. Consequently, when AC power goes on, flip-flop 194 is supplied power and its set input is energized due to the voltage generated across diode 193. Thus, when flip-flop 194 goes on in response to its detection of the occurence of AC power going on, the relay 196 is caused to actuate. As seen in FIG. 6, this causes the voltages at point A and point B to be coupled across the two switch portions S1 and S2 of relay 196 and out as the +5 volt and the −7 volt power supply lines to the other circuits of the calculator 10.

To protect calculator 10 stored tax data against power failure, the circuit 60 includes a memory power off protect means. This means includes two batteries, shown at 197 and 198, which are connected between the +5 volt and −7 volt supply lines. This connection scheme enables these batteries to normally remain charged up so long as AC power is present. During a power failure, no voltage is generated across the diode 188, i.e., at its corresponding points A and B, by the power supply. Thus, the power on indicator light goes off and the set input to flip-flop 194 goes low. The batteries 197 and 198 thereafter provide the power to the +5 and −7 volt supply lines, with diode 195 preventing this auxiliary power source from being fed back to the various AC power supply components, including the light 152. Note that a separate voltage output, indicated as Vmem, is originated from the +5 volt line on the battery side of relay 196 switch S1. Power off flip-flop 194 is also tied to the +5 volt battery 197 on the battery side of switch S1.

Thus, after a power failure has occurred, or AC power removed from the calculator 10 for whatever reason, the next time an AD14 address bit is generated by the microprocessor 30, the power off flip-flop 194 is caused to be reset, since this bit line is connected to the reset input R of flip-flop 194. As a result, the Q output of flip-flop 194 goes low, turning off relay 196. This disconnects the +5 and −7 volt power from all systems except the RAM 36. Power is provided to this unit 36 over the Vmem line which is unaffected by the state of the relay 196 switches. This enables data stored in the RAM to be retained until power can be restored. All other calculator 10 functions, however, are disabled when flip-flop 194 is off. Note that when AC power is present, the periodic presence of a signal on the address bit AD14 line does not affect the state of the power off flip-flop 194.

Note that the power off protect means could also be organized such that as soon as AC power is detected as being removed, the power off flip-flop 194 is reset, to immediately decouple power, via the relay 196 and switches S1 and S2 from all circuits of the calculator 10 except the RAM 36. On the other hand, addition of means for resetting the flip-flop 194 by the microprocessor 30 enables certain steps to be completed by the microprocessor 30 before it is disabled by the switching off of power. Thus, RAM 36 data presently being operated on in the microprocessor 30 would, in this latter sense, be enabled to be restored into the RAM 36 without any data loss.

Note also that as a second alternative, further control can be given to the microprocessor 30 over when system power is switched off. A sense line, identified as the power fail (P.F.) sense line would be preferably coupled to the microprocessor 30 from the power off protect means, via the data in/out gating means 44. Note that if this option were used, a different address bit e.g., AD12 would be needed to reset flip-flop 194, since AD14 is needed to strobe the gating means 44. Thus, the microprocessor 30 could periodically test this P.F. sense line to determine the present power condition of the calculator 10. This would enable the microprocessor 30 to complete as many tasks as required by the control program before a reset signal is caused to be sent to the power off flip-flop 194 for power switch off.

Finally, if the storage capacity of each of the batteries 197 and 198 is sufficiently large, one may continue to operate the entire system by means of the batteries, and eliminate the need for the flip-flop 194 and relay 196. However, no matter what the battery sizes are, with the circuit as shown in FIG. 6 enabling power to be turned off to all circuits except the RAM 36, memory power, and consequently tax data retention, is enabled to be supplied for a maximum length of time. A time duration for memory retention of 360 hours minimum is deemed desirable.

The power off flip-flop 194 is also used to provide a second function. When AC power goes on, flip-flop 194 also goes on, as described above. This state change is used to reset the microprocessor 30, via the RST line, such that the microprocessor 30 is forced to address the data stored in location $\phi\phi\phi1$ in the RAM 32,34. This is the startup address for the control program of the calculator 10.

F. SYSTEM OPERATION 1. RAM and ROM organization.

Before going into a detailed description of the system operation of the calculator 10 apparatus, a description of how the RAM 36 and ROM 32,34 are organized in terms of their memory allocations is described to enable a clearer understanding of the operations of the calculator 10.

A RAM 36 memory map is illustrated in FIG. 7. Shown is a typical organization for the various memory locations that are defined in the RAM 36. The RAM 36 of the present invention consists of 8,192 bits of CMOS memory organized into 1024 words having 8 bits each. Each of these 8 bit words, also described as a word byte, or simply a byte, are individually addressable by the microprocessor 30. With reference to FIG. 7, it is seen that the first 512 8 bit words of the RAM 36 are divided up into 5 working storage registers (WS1-WS5), an area of general working storage, and the file A (this-year) item registers. The second half of the RAM 36, words 513–1024, is organized in the same manner as the first half of the RAM 36, in that the first 5 registers in the second half comprise working storage registers WS1-WS5, then an area of general working storage is provided, and finally an area is set aside for the file B (last-year) item registers. Note that the RAM 36 is expandable and need not be limited to the two files just described.

Recall that the data to be stored in the RAM 36 and also the data temporarily stored in the various working storage registers comprises arithmetic amounts up to 10 decimal digits in length and further includes the arithmetic sign (+ or −) of the amount stored. To store such large numbers, more than one 8 bit byte of storage is required. Consequently, each of the working storage registers identified in the RAM 36 memory may use 4 bytes of memory. Similarly, item registers 1–76 are 4 bytes long and are contained in RAM 36 word locations 53–356, and item registers 77–128 are 3 bytes long and are stored in RAM 36 locations 357–512. The item registers of file B are similarly located in corresponding 4 byte and 3 byte registers in word locations 565–1024, with locations 513–564 used for file B working storage. Note that the general working storage areas 21–52 and 533–564 can be accessed by the microprocessor 30 and control program on a single byte or multiple byte (field) basis. Further, when the calculator 10 is in the arithmetic calculations (ARITH) mode, only bytes 1–52 of RAM 36 are used by the microprocessor 30.

In both the data entry and the tax form compute modes of the calculator 10, access to either the RAM 36 field comprising storage locations 1–512 or the field comprising the storage locations 513–1024 is controlled by whether or not switch SW is respectively in its this-year or last-year switch position. As described above, this switch position is detected by the mode register 180 in the mode selection means 50 as shown in FIG. 5. Thus, when switch SW1 is in the this-year position, the AD$\phi$9(SW) signal out of the mode register 180 is low, thereby causing only the first 512 words of the RAM 36 to be accessible by the microprocessor 30. Similarly when switch SW1 is in the last-year position, the AD$\phi$9(SW) signal is high, thus forcing the microprocessor 30 to be able to only access the RAM 36 words contained in locations 513–1024. Thus, this extra address bit need not be retained by the microprocessor 30 or the control program during the calculator 10 operations in either the data entry or the compute mode. Note, however, that address line AD$\phi$9 is wire-OR'ed at the RAM 36 with the address bit AD$\phi$9 generated by the microprocessor 30, to enable the microprocessor 30, during the year-end mode, to disregard the position of switch SW1. An added AND gate may also be required to ensure than when AD$\phi$9 is asserted by the microprocessor 30, address bit AD$\phi$9(SW) is thereby inhibited. This wire-OR'ing is needed during the year-end mode, since the microprocessor must address the entire RAM 36. This is required because the function of this mode is to take the contents of file A, load them into file B, and thereafter erase the data contained in file A.

To further lessen the amount of data required in the control program to perform RAM 36 addressing, each of the 512 bit blocks of storage in the RAM 36 are allowed to be addressed by means of only 8 bits of data. With 8 bits of address data, one is normally only capable of addressing up to 256 locations. An address determination algorithm is provided to enable the full 512 bits of storage in each RAM 36 block to be accessed by the microprocessor 30 during the data entry and compute modes. The details of this algorithm will be described below in the data entry mode section of the system operation portion of the specification. However, preliminary it can be explained that this algorithm takes into account the fact that each of the item registers in both work blocks 1-512 and 513-1024 comprises at least 3 bytes of storage. As a result, less than 256 such registers are defined in each work block. The algorithm calculates the starting byte address of each item register, thereby reducing the need for addressing capability to below 256 locations or 8 bits of address data.

TABLE II

| DEDUCTIONS | | CREDITS | |
|---|---|---|---|
| CONTRIBUTIONS | Item Register No. | TAXES | Item Register No. |
| Cash Contr. (Receipt or Check) | | 1 Income, State & Local | 27 |
| Other Cash Contributions | | 2 Gasoline, State & Local | 28 |
| | | 3 Personal Property | 29 |
| | | 4 Real Estate | 30 |
| Contributions Not in Cash | | 5 Sales Tax | 31 |
| Carryover from previous years | | 6 Other, Automobile Use | 32 |
| | | Other, $\pi 2$ | 33 |
| | | Other $\pi 4$ | 34 |
| INTEREST PAID | | | |
| Home Mortgage | 7 | | |
| Car Loan | 8 | | |
| Other Loan | 9 | | |
| Time Payments | 10 | | |
| Revolving Charges | 11 | | |

Table 11 gives a partial listing of the specific categories of data, each being an item register defined in each of the files, file A and file B, of the present invention. The calculator 10 user wishing to store interest paid on his home mortgage, for example, would look up in the item register table to find that the register identified as item register 7 is where this data is to be stored. Thus, to enter this data into item register 7, the calculator 10 user need only follow the procedures of the data entry mode described below.

The read only memories 32 and 34 are also organized into different segments. Each of the various calculator 10 operating modes are defined in routines in one or the other of the ROM's 32,34 and are accessed under the supervision and control of the mode selection means 50 and the control program.

The ROM 32 contains that portion of the control program needed to enable the calculator 10 to perform the functions of a standard arithmetic calculator, and to enable the performing of the data entry mode and year-end mode operations. The ROM 32 further contains the supervisory routine needed to periodically sense the current calculator 10 mode selected by the calculator 10 user, as indicated on the sense A and sense B lines to the microprocessor 30. Reference again is suggested to Table I, wherein the above-described calculator 10 modes of operation are correlated to specific states for the sense A and sense B lines.

The ROM 34 contains that portion of the control program which contains all the programming and control information needed to enable the calculator 10 to automatically compute the information needed on the specific tax forms identified as being operable by the calculator 10. Specifically, in the preferred embodiment of the present invention, the portion of the control program contained in the ROM 34 lists in correct order all lines found on the standard U.S. IRS 1040 form and its attendant Schedules A and B. Further, this control program portion enables appropriate entries by the calculator 10 user, calculates the necessary answers, and further may set limits prescribed by the then valid tax legislation. As described above, this ROM 34 control program is enabled only when switch SW2 is in the compute mode position, i.e., sense A and sense B lines are in the 11 state, and switch SW1 is not in the ARITH position.

As described above, the ROM 34 is also called the programming assembly. As shown in FIG. 1, the ROM 34 includes a plug 200 which will mate with a receptacle 202 on the calculator 10. Consequently, when procedures are changed on one of the tax forms for a new year, or if other tax forms such as state tax forms are desired to be filled out under calculator 10 control, the programming assembly, i.e., the ROM 34, may be replaced with a new ROM 34 containing different control functions, such that the new forms can equally be filled out by the calculator 10 apparatus as is presently enabled for the IRS 1040 form and the Schedule A and B forms.

2. CALCULATOR MODE SELECTION AND THE CONTROL PROGRAM SUPERVISORY ROUTINE.

As previously described, mode selection for the calculator 10 apparatus is manually enabled by means of switches SW1 and SW2 on the front panel of the calculator 10, as shown in FIG. 3. Switch SW1 has three positions, the ARITH, this-year, and last-year positions. When in the ARITH position, the calculator 10 disregards the item/line switch and the display switch, and allows only the standard arithmetic calculation functions found on the keyboard to be performed by the calculator 10. When switch SW1 is in the this-year position or the last-year position, the arithmetic functions are disabled, and the item/line and display switches are enabled. Again, the hardware for providing these functions is shown in FIGS. 4 and 5. Also, as described in the preceding section, when switch SW1 is in the this-year position, address line AD$\phi$9 (SW) is held low such that only the first portion of the RAM 36 is normally accessed by the microprocessor 30, and when switch SW1 is in the last-year position, address bit AD$\phi$9(SW) enables only the latter half of the RAM 36 memory to be normally accessed by the microprocessor 30.

Switch SW2 also has three positions, the enter, compute and year-end positions. When switch SW2 is in the enter position, data entry is enabled to the RAM 36 stored locations, with file A being enabled to be accessed if switch SW1 is in the this-year position and file B being enabled to be accessed if switch SW1 is in the last-year position. With switch SW2 in the compute position, tax form calculations and listing of the correct order of all times found on the forms is enabled to be performed by the calculator 10. With switch SW2 in the year-end position, the calculator 10 shifts the information contained in file A into file B and clears file A. This enables the upcoming tax year data to be entered into file A.

The item/line switch key has a different function depending on whether or not switch SW2 is in the enter or compute position. When switch SW2 is in the enter position, depression of this key, when preceded by the entry of one or more digits, causes the calculator 10 to access the item register in the item register table given above. This item number is displayed in positions 10-8 of the display 156. The calculator 10 is thereby enabled to accept and accumulate a new amount into this selected register via the numeric keys and the sign keys. The amount being entered and the sign of the amount (+ or −) is displayed on the display 156 in digits 1–6. Digit 7 remains blank to provide a space between the displayed item number and the displayed amount. The initial register amount presently stored in the selected item register may also be displayed on the display 156 in digits 1 through 6, by depressing the display key. Digit 7, again, remains blank. The display key is functional only when switch SW2 is in the enter mode. It is recognized by the microprocessor 30 only after the depression of the item/line. Depression of the display key enables the previously stored data contained in the selected item register to be displayed.

When switch SW2 is in the compute position, depression of the item/line key causes the calculator 10 to advance one step (one line on the form) in its process of listing and computing all lines of the standard 1040 form and its attendant Schedules A and B. The amounts being operated on and to be transcribed to the present form being computed, is displayed on digits 1–6 of the display 156. Again, digit 7 remains blank. Note that only the rounded off whole dollar amount is displayed by display 156 during this mode.

The supervisory routine of the control program is shown in FIG. 8A. As mentioned above, this routine is stored in the ROM 32. The initial function of the supervisory routine is to provide for the initial housekeeping functions needed by the microprocessor 30 when power is first turned on. Thus, the starting address of the supervisory routine is address location $\phi\phi\phi1$, which is automatically accessed by the microprocessor 30 upon being reset. Once the preliminary housekeeping functions have been performed, under the control of the instructions contained in the ROM 32 beginning at address $\phi\phi\phi1$, the supervisory routine of the control program then tests the current state of the sense A and sense B lines to determine the present selected mode for the calculator 10. Note also that a return line is shown as coming into the program flow at this point. As described in more detail below, each of the various modes of operation of the calculator 10 are programmed such that at the end of the given operations of each mode routine, this portion of the control program is reaccessed so that the state of the two sense lines, and thereby the state of the manually selectable switches SW1 and SW2 are periodically retested by the microprocessor and control program to enable detection of any changed mode having been selected by the calculator 10 user.

Referring again to FIG. 8A, as can be seen, the first test of sense lines A and B is simply to determine if these lines indicate a $\phi\phi$ state. If the test is affirmative, the arithmetic mode (ARITH) of the calculator 10 has been chosen. The supervisory routine then causes the control program to transfer to the arithmetic mode routine of the control program for performance of the available calculator 10 arithmetic operations. No attempt is made herein to describe an arithmetic routine usable with the present invention, since such a routine is considered conventional and common to the art.

The supervisory routine next tests the sense A and B lines to see if a $\phi1$ state is present. If this test is affirmative, the year-end mode (YEMOD) routine is caused to be accessed by the control program. This routine is further discussed hereinbelow and is illustrated in FIG. 8C.

If the above test is not affirmative, the supervisory routine then checks the sense A and B lines to see if a 11 is present. If this test is affirmative, the control program transfers to the compute mode routine (COMOD). This routine is discussed hereinbelow and is also illustrated in FIGS. 8D and 8E. If the above test is also negative, the control program is caused to access the data entry mode (ENMOD) routine illustrated in FIG. 8B.

3. THE ENTER MODE ROUTINE

A flow chart of the Enter Mode routine of the control program is illustrated in FIG. 8B. In the present embodiment of the calculator 10 apparatus, taxable income and tax deductible expenses can be accumulated by the calculator 10 for two full years or periods. When switch SW1 is in the this-year position, the calculator 10 automatically has access to file A, and when switch SW1 is in the last-year position, the calculator 10 has automatic access to file B. As described above, the enter mode is accessed by a calculator 10 user when he wishes to access one or more storage registers for the storing of tax data therein, or alternatively to determine what the present amount is that is presently being stored in a given tax item register.

Referring now to FIG. 8B, when the enter mode is manually selected by the calculator 10 user, the supervisory routine transfers the control program to the enter mode routine. The first function of the enter mode routine is to clear the display and the working storage registers. Next, the keyboard 150 is scanned for detection of the depression of one of its switch keys. Also, the display 156 is updated with any current information needing to be shown thereon. This scan keyboard/display routine is conventional, so that no further detail as to the functioning of this routine is provided.

The first calculator 10 user step in the enter mode is to manually enter the location of the specific storage register desired to be accessed by the user. Thus, the enter mode routine tests to see if a digit key has been depressed by the calculator 10 user. This key identity is displayed and stored. The keyboard is again scanned to see if a second digit has been inputted by the calculator 10 user. If a digit has been depressed, this second digit is also stored and displayed.

The enter mode routine also looks for the depression of the item/line switch. The present embodiment includes 128 registers so that a maximum of three digits should be entered. Note that more registers could be provided, the amount being limited only by the size of the available RAM. If the item/line switch is not depressed after the digits have been entered by the user, an error is indicated, and either the clear or the clear entry switch must be depressed before the calculator 10 will continue in the enter mode.

When the item/line key depression has been detected, the item number entry made by the calculator 10 user is then tested to ensure that it is a number within the bounds of the present amount of file storage registers available for tax data. If the entry is a proper entry, in this case an item register number of less than 129, the next step is to perform an algorithm on this number to calculate the actual address in the RAM 36 wherein the register is located. As described above, each item register is in fact 3 or 4 bytes of memory, each byte having its own unique address. The 4 byte registers are registers 1–76, and the 3 byte registers are registers 77–128.

Therefore, the first test is to determine whether or not the selected register is a 3 byte register or a 4 byte register. If the register number is not less than 77, the 3 byte algorithm is performed. As shown in FIG. 8B, this algorithm causes the item register (IR) number, the entry number, to have 77 subtracted from it. The resultant number is then multiplied by three, and then added to 357 to get the actual RAM 36 address for this register. The number 357 is the starting address of the 3 byte registers, as mentioned above in the RAM 36 memory map section of the specification. For example, if the register 77, the first 3 byte register defined in the RAM 36, is desired to be accessed by the calculator 10 user, we know that this 3 byte register begins at location 357 in the RAM 36. Plugging in the number 77 into the address determination algorithm, it is seen that 357 is the resultant address number generated by the algorithm. If register 80, as another example, is desired to be accessed by the user, one can see that upon plugging this number into the algorithm, one attains 80 - 77 or 3, multiplied by 3 to equal 9. Adding 9 to 357 gives an address of 366, the resultant algorithm value, and therefore the starting address of the 3 byte register identified as item register 80.

If the item register selected is of a number less than 77, a second algorithm is used. This is because the registers 1–76 are 4 byte registers which are contained in locations 53–356 of the RAM 36. The algorithm for these 4 byte registers is also shown in FIG. 8B. This algorithm causes the IR number to have a one substracted from it. The resultant number is multiplied by 4 and then added to 53 to get the actual RAM 36 address. The number 53 is added since the starting address must reflect the fact that the first 52 registers of the RAM 36 are working storage and not used for item register storage. Thus, for example, if item register 50 is desired to be accessed, one can see that upon plugging this number into the algorithm, we obtain 50 less 1 or 49, times 4, which equals to 196. Adding this to 53 equals a final amount of 249. Therefore, this value is the starting address of the 4 byte item register 50. The address of all other item registers are similarly obtainable.

Note that these algorithms only operate for the words addressed in the first 512 bits of the RAM 36. Recall that the words in the second half of the RAM 36 are equally addressable by addressing words 1–512 since the address bit used to determine whether or not the first 512 words or the second 512 words of the RAM 36 are accessed, is controlled by the mode switch SW1 and the resultant generated AD$\phi$9(SW) signal, as shown in FIGS. 1 and 5.

As seen in FIG. 8B, once the control program has found that a proper item register has been identified by the calculator 10 user, it transfers the item register number to the display 156 digit positions 10–8. The enter mode routine then checks to determine whether or not the display key has been hit, to enable display of the contents of this selected item register. If the display key was not depressed, the calculator 10 user is enabled to either press the clear or clear entry key to return the control program to the supervisory routine, or the user can add or subtract a new amount from the selected item register by entering this amount in the keyboard 150. Once this value has been entered into the item register, the enter mode routine causes the control program again to return to the supervisory routine.

If the display key was depressed, however, and the contents of the selected item register are displayed thereby, the calculator 10 user has a second option. Either he can immediately select another item register to be displayed, or he can clear the contents of the presently selected item register. This functioning is performed by beginning with a test of whether or not the clear key has been depressed. As can be seen in FIG. 8B, if the clear key is not depressed, the enter mode routine causes the control program to return to the beginning of the enter mode routine. If the clear key is depressed, however, the display is blinked to provide a warning to the calculator 10 user that the contents of the chosen item register are going to be erased. If the user then depresses the clear key a second time, the erasure of the contents of the item register is completed, and the control program is returned to the supervisory routine. If a second clear depression does not occur, the control program is returned to point A of the enter mode routine for receipt of a new item register number from the calculator 10 user.

4. THE YEAR-END MODE ROUTINE.

The year-end mode (YEMOD) routine is illustrated in FIG. 8C. When the supervisory routine determines that the year-end mode has been selected, the control program switches to this routine. The purpose of this routine is to enable the calculator 10 user to update his storage file registers so that data from the new year's tax transactions, or transactions from any new time period, are enabled to be stored in the calculator 10. Normally, when the calculator 10 is being used for tax data retention, the user will execute the year-end routine on the first day of the new year. Note, however, that the data already accumulated over the previous year needs to be retained, at least until the tax forms for that year are prepared. Since certain types of data have usually not been accumulated yet by the first of the new year, the year-end mode routine enables the data accumulated during the preceding year to be retained. Thus, the data accumulated through the year and contained in item registers in file A is caused by the year-end routine to be transferred to corresponding item registers in file B. File A is then erased, to enable data from the upcoming year to be inputted thereto.

The procedure to be followed to initiate the year-end mode routine functions, once the mode switches SW1 and SW2 are in the proper position, is merely to depress the clear (CLR) key on the keyboard 150 two times. Referring again to FIG. 8C, the flow chart of the year-end mode routine illustrates that this routine scans the keyboard and waits for the clear key to be depressed. If this key is not depressed, an error indication is generated by the year-end mode routine, and the control program is transferred back to the supervisory routine. When a clear key depression has been properly detected, the display 156 is caused to be blinked with all segments of each digit 1–10 being on. This is to provide a warning to the calculator 10 user that the year-end mode functions are about to take place, that is, that the file B contents will be erased and that the file A contents will be transferred to file B. The year-end mode routine then waits for the second clear key depression to take place and when it has detected this condition, it proceeds to clear file B, move the contents of file A to file B, and then clear file A. Finally, when this step has been completed, the year-end mode returns the control program to the supervisory routine.

5. THE COMPUTE MODE ROUTINE

As mentioned above, the compute mode routine is contained within the ROM 34, also identified as the replaceable programming assembly. It is selected by the calculator 10 user when switch SW2 is in the compute position and switch SW1 is in either the this-year or the last-year position. Normally, only the data in file B, the last-year data, will be used by the calculator 10 user in computing his tax and filling out the 1040 and Schedules A and B tax forms. This is because the this-year file normally does not contain all the needed data required to fill out the tax forms until after the end of the year. As described above, usually at this time the last-year file, file B, is caused, under the control of the year-end mode routine, to contain the data needed to fill out the tax forms, so that the this-year file, file A, is left free to be used for storage of tax transaction data in the current year. Nonetheless, the user has the option, by means of switch SW1, to cause the compute mode routine to access either file A or File B in the computation of the tax forms.

The compute mode routine guides the calculator 10 user automatically through the compilation of a standard IRS 1040 form and its attendant Schedules A and B, with each form being filled out in its correct line-to-line order. To provide these functions, the ROM 34 is divided up into two parts, a control subroutine and a table of control words. The control words provide the specific operating information needed for each line defined on the tax forms. These control words also define on which form the given line is to be associated with, including means for controlling the state of the three tax form indicators shown on the display 156. These indicators are the schedule A indicator, the schedule B indicator, and the 1040 indicator. Table III illustrates the format of each control word, including the defining of the purpose of specific bits therein.

TABLE III

| F1 | F2 | F3 |
|---|---|---|
| C4,C3,C2,C1,B12-- | - - - - - - - B1 | A8 - - - - A1 |

|  | BYTE 1 | BYTE 2 | BYTE 3 |
|---|---|---|---|
| F1 { | C4,C3<br>00-NO INDICATOR ON<br>01-SCH. A INDICATOR ON<br>10-SCH. B INDICATOR ON<br>11-1040 INDICATOR ON | C2,C1<br>00-COMOD SUB. #1<br>01-COMOD SUB. #2<br>10-COMOD SUB. #3<br>11-COMOD SUB. #4 | } |

As can be seen from table III, each control word is 3 bytes long to thereby comprise 24 bits of data storage per word. The control word is divided up into three fields, field F1, F2, and F3. Field F1 is shown in detail in table III. Field F1 is four bits long, bits C1 to C4, and contains the information in bits C3 and C4 for defining which indicator is to be turned on at the display 156. Field F1 also contains in bits C1 and C2 information as to which of the compute mode control subroutine sections is to be accessed for the given control word. Field F2 and 12 bits long and comprises three hexadecimal digits respresenting the line number on the given form 1040, Schedule A or Schedule B. Finally, field F3 is eight bits long and comprises a binary number representing the name of an item register, the contents of which are to be used by the compute mode control subroutine portion to access the item register and fetch the contents thereof.

The various tax form indicators, described above, are only caused to be turned on as a function of these two bits C3 and C4. Specifically, the Schedule A indicator goes on as a function of a specific control word, only when bits C3 and C4 in that order are in the $\phi 1$ state. Similarly, the Schedule B indicator only goes on when bits C3 and C4 are in the $1\phi$ state. Finally, the 1040 indicator goes on when bits C3 and C4 are in the 11 state.

The manual indicator light on the display 156 is only turned on by the compute mode routine when an entry may be made from the keyboard 150 by the calculator 10 user during the tax form compute mode. This entered amount will be used by the calculator 10 during the calculation of the given line presently being operated on by the compute mode routine. The calculator 10 will disregard for that one step, the contents of the item register data contents normally obtained for that line. The contents of this item register, however, are not affected by this manually introduced amount, so that if the compute mode routine is later used again to re-calculate the various tax forms, the original item register amount is used therein. In other words, an item registers' content can only be modified in the enter mode. However, a modified amount can be used when performing the compute mode calculations if this amount is manually entered by the user.

Referring now to the flow chart of the compute mode routine beginning on FIG. 8D, the first test by the routine determines whether or not a ROM 34 has been plugged in to the available receptacle 202 in the calculator 10. If no ROM 34 is present, tax form calculations cannot be performed. In this case, the control program is transferred back to the supervisory routine. If, however, the test for data is affirmative, a control word counter location is defined in the RAM 36 working storage and is set to zero. This storage location will become the pointer for subsequent access to the control words used by the control subroutine portion of the compute mode routine to perform the various calculations and line steps on the tax forms.

At this point in the compute mode routine, computation of the tax forms is enabled to be begun. The procedure to be followed by the calculator 10 user in filling out the various tax forms is to press the item/line switch key on the keyboard 150 whenever the user is ready to continue to the next step in the compilation of the tax returns. In the present embodiment, a logical beginning for the compilation of the tax returns is line one of Schedule A. When the user hits the item/line switch for the first time in the compute mode, the Schedule A indicator will go on, and manual light will go on, and the line number on display 156, digits 10-8, will indicate the number 1. Lastly, the amount shown in digits 1-6 will be the calculator 10 user's accumulated total for the tax item register defined to have the information needed for line 1 of Schedule A. In 1974, for example, this line would have the accumulated insurance premium paid by the calculator 10 user as entered into that tax item register by the user during the previous tax year.

The control subroutine (of the compute mode routine) operates to carry out the above functioning as shown in FIG. 8D. First the routine scans the keyboard 150 to determine if the item/line switch has been depressed. When it detects this condition, it increments the control word counter by 1, such that a control word at location 1 in the control word table is accessable thereby. The routine then checks to make sure that the compilation of the various tax forms has not yet been completed by checking if all steps have been performed, a total of "ENDCOUNT" steps, and then reads the specific control word at that location. Note that if the computation for the various tax forms is found to have been completed, at this point the control subroutine causes the control program to return to the supervisory routine.

With the control word for line 1 of Schedule A read out from the read-only memory 34, the microprocessor 30 is enabled to decode this control word into its individual parts, defined above as being fields F1, F2, and F3. As a result, field F1 is read to determine which of the tax form indicators is to be turned on. Since in this case, Schedule A is the first tax form being operated on, bits C3 and C4 will indicate state $\phi 1$, and the Schedule A indicator light will be turned on in response thereto. Secondly, the field F2 will be read and the line number contained therein will be displayed on the display 156. Again, since we're starting off with line 1 of Schedule A, the line number stored in field F2 of the first control word will be line number 1. Finally field F3 will be read. This field defines the address of the item register having the data needed to fill in line 1 of Schedule A. Note that the same algorithm used in the enter mode routine to determine the actual item register address is used here, so that again only 8 bits of address are needed to define all the item register locations. Thus, when this address is computed, the contents of the identified item register are fetched and stored in one of the working storage registers of the RAM 36.

With these preliminary operations completed, the control subroutine then looks to the first two bits of field F1, bits C1 and C2, to determine which of the compute mode subroutines is to be accessed in determining the value to be filled in by the user on line 1 of Schedule A. This branching is desirable, since certain of the operations throughout the compilation of the tax forms are similar, e.g., the addition of a plurality of amounts to come up with a sum amount. Thus, the data bits C1 and C2 of field F1 provide an indication of which specific subroutine is to be accessed by the control subroutine to enable the specific computation required for that given line to be carried out. Thus, as can be seen from the flow chart in FIG. 8D, bits C1 and C2 of the control word are tested to determine which subroutine is to be branched to by the control program.

The compute mode subroutine #1, as seen in table III, is accessed when bits C1 and C2 are $\phi\phi$. As shown in FIG. 8E, this subroutine first displays the contents of the fetched item register. If then provides an opportunity for the user to modify this displayed amount with a manual entry from the keyboard 150. As mentioned above, during this time the manual light indicator on display 156 is lit. Once the amount is final, the calculator 10 user need only depress the item/line key to continue with the tax form compilation. Before going on to the next line, at this point the subroutine causes the obtained amount to be accumulated as a running subtotal in a second working storage register. Thus, subroutine #1 is accessed by a control word when such data accumulations are required on the tax forms. Once this subtotal has been formulated, the subroutine returns to the control subroutine at point C of the compute mode control subroutine.

Subroutine #2 is also shown in FIG. 8E. This subroutine is accessed by a control word when data is simply to be displayed on the display 156 with no subtotals being needed therefrom. Thus, this routine merely provides for the item register contents associated with the given line defined by the control word to be displayed to the calculator 10 user. When this has been completed, this subroutine transfers control back to the control subroutine at point B. Thus, the control subroutine is enabled to scan again the keyboard 150 for an item/line key depression by the calculator 10 user, indicating that the next line compilation should be performed.

Subroutine #3 is also shown in FIG. 8E. This is the subroutine that enables the sum total of the amounts totaled up via subroutine #1 to be displayed on display 156. Once this amount has been displayed such that the user can copy down this amount onto his tax form, the calculator 10 waits for depression of the item/line key to indicate that the user desires the next line to be computed. When this occurs, the working storage registers having the subtotals therein are cleared, and the subroutine transfers control back to the control subroutine at point C.

Subroutine #4 is a subroutine wherein specific non-repetive routines needed by given lines are contained. Since such routines are so specific, and since they are within the state of the art, they are not described herein. Again, when the given routine needed by the specific control word line number has been completed, transfer is again returned to the control subroutine at point C.

Referring back to the control subroutine, beginning at the point 3 or C reached after each subroutine has been completed, note that each time the program passes this point, the control word counter in the RAM 36 is incremented by 1. This sum is tested to see whether or not the counter has counted up to the end of the tax compilation sequence. If it hasn't, the control subroutine then causes the microprocessor 30 to read in the next control word defined at the address location corresponding to the present count of the control word counter. Thus, with this new control word, the same decoding of the fields F1, F2 and F3 is performed by the control subroutine to enable the next line of the given tax form to be processed by the compute mode routine.

It is to be understood that the foregoing description is merely illustrative of preferred embodiments of the invention and that the scope of the invention is not to be limited thereto but is to be determined by the scope of the appended claims.

1 claim:

1. A calculator for use in combination with forms having a plurality of numbered lines each requiring the recording thereon of output data obtained by performing predetermined mathematical operations on predetermined items of entered data individually accessible at various intervals over a period of time, comprising:
(a) random access memory means including a plurality of data storage registers each assigned to a predetermined item of entered data;
(b) read only memory means having a control program defined therein;
(c) display means including means for displaying
 i. the identity of a specific form;
 ii. data; and
 iii. a specific line number of said form;
(d) processor means operatively connected to said random access memory, read only memory, and display means, and controlled by said control program;
(e) mode selection means for activating a selected one of a plurality of operating modes including a data entry mode and an output mode; and (f) keyboard means operatively connected to said random access memory, processor, and mode selection means for inputting said entered data and item identification, and for selecting one of said modes;

(g) said calculator in said data entry mode being operative to store the entered data in the identified one of said data storage registers allocated to said item for at least said period of time;

(h) said calculator in said output mode being operative in accordance with said control program to automatically select predetermined items of stored data, perform said predetermined mathematical operations thereon thereby generating output data, and display, under the control of said keyboard, sequentially for each of said numbered lines
  i. the line number and the identity of the form on which it appears; and
  ii. the output data to be recorded on that line.

2. A calculator for use in combination with forms having a plurality of numbered lines each requiring the recording thereon of output data obtained by performing predetermined mathematical operations on predetermined items of entered data individually accessible at various intervals over a period of time, comprising:

(a) random access memory means including a plurality of data storage registers each assigned to a predetermined item of entered data;

(b) read only memory means having a control program defined therein;

(c) display means including means for displaying
  i. the identity of a specific form;
  ii. data; and
  iii. a specific line number of said form;

(d) processor means operatively connected to said random access memory, read only memory, and display means, and controlled by said control program;

(e) mode selection means for activating a selected one of a plurality of operating modes including a data entry mode and an output mode; and (f) keyboard means operatively connected to said random access memory, processor, and mode selection means for inputting said entered data and item identification, and for selecting one of said modes;

(g) said calculator in said data entry mode being operative to combine said entered data with any previously entered data elements of the same item, and store the data resulting from said combination in the identified one of said data storage registers allocated to said item for at least said period of time;

(h) said calculator in said output mode being operative in accordance with said control program to automatically select predetermined items of stored data, perform said predetermined mathematical operations thereon thereby generating output data, and display, under the control of said keyboard, sequentially for each of said numbered lines
  i. the line number and the identity of the form on which it appears; and
  ii. the output data to be recorded on that line.

3. A calculator for use in combination with forms having a plurality of numbered lines each requiring the recording thereon of output data obtained by performing predetermined mathematical operations on predetermined categories of input data composed of data elements individually accessible for entry at various intervals over a period of time, comprising:

(a) random access memory means including a plurality of data storage registers each assigned to a predetermined category of input data;

(b) read only memory means having a control program defined therein;

(c) display means including means for displaying
  i. the identity of a specific form;
  ii. input data category identification;
  iii. data; and
  iv. a specific line number of said form;

(d) processor means operatively connected to said random access memory, read only memory, and display means, and controlled by said program;

(e) mode selection means for activating a selected one of a plurality of operating modes including a data entry mode and an output mode; and (f) keyboard means operatively connected to said random access memory, processor, and mode selection means for entering input data elements and category identification, and for selecting one of said modes;

(g) said calculator in said data entry mode being operative to display an entered input data element and its entered category identification, combine said entered input data element with previously entered input data elements of the same category, and store the data resulting from said combination in a specific one of said data storage registers allocated to said category for at least said period of time;

(h) said calculator in said output mode being operative in accordance with said control program to automatically select predetermined categories of stored data, perform said predetermined mathematical operations thereon thereby generating output data, and display, under the control of said keyboard, sequentially for each of said numbered lines
  i. the line number and the identity of the form on which it appears; and
  ii. the output data to be recorded on that line.

4. The calculator of claim 3 wherein said display means further comprises:
  means for enabling said output data and said specific line number to be displayed simultaneously during said output mode; and
  means for enabling said input data category identification and said entered input data to be simultaneously displayed during said data entry mode.

5. The calculator of claim 3 wherein said read only memory means further comprises:
  a first read only memory; and
  a second read only memory,
  said first read only memory defining the portion of said control program including general calculator supervisory operations and calculator data entry mode operations; said second read only memory defining the portion of said control program including calculator output mode operations, said calculator further comprising means for enabling said second read only memory to be unplugged from said calculator, and for enabling a new second read only memory to be substituted therefor, to enable thereby periodic updating of said output mode operations.

6. The calculator of claim 3 wherein said random access memory means comprises a plurality of files, each file including a plurality of data storage registers wherein each storage register is assigned a predetermined category of input data; and wherein said mode selection means further comprises means for selectively enabling one of said plurality of files to be accessed by said calculator with said calculator operating in one of its said plurality of operating modes.

7. The calculator of claim 6 wherein said calculator further includes a year-end mode, said calculator in said year-end mode being operative to selectively erase a complete file of said random access memory means, and thereafter transfer the contents of a second file to said erased file, and thereafter cause said second file to be erased.

8. The calculator of claim 3 wherein said mode selection means comprises:

a plurality of manually selectable switches operatively connected to said keyboard means; and means for detecting the current state of said plurality of swtiches, said means including mode register means.

9. The calculator of claim 3 further comprising power off protect means for protecting the data stored in said random access memory means from being destroyed due to loss of external power to said calculator, said means comprising:

a battery for supplying backup power to said random access memory means;

means for detecting the loss of external power to said calculator;

means for isolating said backup power from the power coupled to the rest of said calculator when external power loss has been detected.

10. The calculator of claim 9 wherein said power off protect means further comprises means for enabling said calculator to couple power to all of said calculator for a period of time after external power loss has been detected, to enable selected portions of calculator operating modes to be completed prior to the decoupling of power to all portions of said calculator except the random access memory means.

11. The calculator of claim 9 wherein said keyboard means further includes a power-on indicator light, and said power-off protect means further comprising means for decoupling power from said power-on indicator light when a power loss has been detected by said calculator.

12. The calculator of claim 3 wherein said mode selection means further comprises means for activating an arithmetic mode, and wherein said keyboard means further comprises a plurality of arithmetic function keys, said calculator in said arithmetic mode being enabled to perform standard arithmetic calculations as a function of said keyboard arithmetic function keys, said display means including means for displaying said inputted arithmetic data amount and subsequently displaying the data amount resulting from the selected arithmetic computation.

13. The calculator of claim 12 wherein said mode selection means further comprises means for disabling said arithmetic function keys of said keyboard means when said arithmetic mode is not activated by said mode selection means.

14. A multi-mode calculator apparatus, in combination with one or more tax forms, business forms requiring calculations therefor, or the like, for automatically performing the line-by-line calculations of the various amounts required to be filled in on said form of forms, comprising:

(a) random access memory means including a plurality of data storage registers;

(b) read only memory means having a control program defined therein;

(c) processor means controlled by said control program;

(d) display means including means for displaying the identity of a specific form, means for displaying data amounts, and means for displaying a specific line number of said form;

(e) a keyboard, including a plurality of digit keys and a plurality of function keys; and (f) mode selection means for selectively enabling one of a plurality of calculator operating modes to be manually chosen, including first and second operating modes;

(g) said first operating mode including means in combination with said processor means controlled by said control program for detecting the address of a specific one of said plurality of storage registers as said address is manually inputted on said keyboard, and including means in combination with said processor means controlled by said control program for detecting data manually inputted on said keyboard and for storing this data in said addressed register;

(h) said second operating mode including means in combination with said processor means controlled by said control program for automatically selectively accessing predetermined storage registers and for performing calculations thereon, such that the data amounts needed by each said line on the given form are sequentially generated, and including means for causing said means for displaying a specific line number of said form to be updated such that the data amount displayed by said display means corresponds to the data amount required to be recorded on the form at that line.

15. A calculator for use in combination with one or more tax forms, business forms requiring calculations therefore, or the like, for automatically performing the line-by-line calculations of the various amounts required to be filled in on said form or forms, comprising:

(a) random access memory means including two files, a this-year file and a last-year file, each said file including a plurality of data storage registers wherein each register is assigned a predetermined category of input data;

(b) read only memory means including a first read only memory having a first control program portion defined therein, and a second read only memory having a second control program portion defined therein;

(c) plug means for enabling the periodic replacing of said second read only memory;

(d) display means including means for displaying
   i. the identity of a specific form;
   ii. input data category identification;
   iii. data; and
   iv. a specific line number of said form;

(e) processor means operatively connected to said random access memory, read only memories, and display means and controlled by said control programs;

(f) mode selection means for activating a selected one of a plurality of operating modes including a data entry mode, an output mode, and a year-end mode; and (g) keyboard means operatively connected to said random access memory, processor, and mode selection means for selectively entering input data elements and category identification to either said this-year or said last-year file; and for selecting one of said modes;

(h) said calculator in said data entry mode being operative in accordance with said first control program portion to display an entered input data element, its entered category identification, and its file designation, to combine said entered input data element with previously entered input data elements of the same category in the same file, and to store the data resulting from said combination in a specific one of said data storage registers allocated to said category in said file;

(j) said calculator in said output mode being operative in accordance with said second control program portion to automatically select predetermined categories of stored data in a selected file, perform said predetermined mathematical operations thereon thereby generating output data, and display, under the control of said keyboard, sequentially for each of said numbered lines
   i. the line number and the identity of the form on which it appears;
   ii. the output data to be recorded on that line; and
   iii. the file from which said stored data was obtained;

(k) said calculator in said year-end mode being operative in accordance with said control programs to automatically erase the contents of said last-year file, transfer the contents of said this-year file to said last-year file in corresponding data storage registers therein, and thereafter erasing the contents of said this-year file.

16. The calculator of claim 15 wherein said display means further comprises means for indicating that manual entry of a data element is enabled, and wherein said calculator in said output mode is further operative to indicate, for predetermined numbered lines on a form, that manual entry of a revised data element is enabled, said calculator being operative, when such a revised data element is entered in response thereto for a given line, to perform said predetermined mathematical operations using said revised data element to generate said output data for that line, said predetermined categories of stored data for that line being unused.

17. In a multi-mode calculator apparatus including a keyboard unit, a display unit, a processor, a read only memory having a control program defined therein, a random access memory including a plurality of data storage registers, and mode selection means, a method for providing information specifically adapted to facilitate the step-by-step filling out of one or more forms having a plurality of numbered lines thereon, comprising the steps of:

(a) entering and storing a plurality of data items, each item being stored in a specific one of a plurality of storage registers in said random access memory;

(b) clearing a control word count storage register;

(c) electronically incrementing said control word count by one count;

(d) electronically using said control word count to obtain a predetermined control word stored in said read only memory, said control word identifying mathematical operations for a specific line on a specific form, and identifying the specific form and line number;

(e) automatically selecting one or more data items from said storage registers and performing thereon one or more predetermined mathematical operations, as identified by said control word, to generate an output data amount thereby;

(f) displaying:
   i. the specific line number;
   ii. the identity of the form on which said line number appears; and
   iii. the output data amount generated from said mathematical operations, said amount thereby being enabled to be recorded on that line; and (g) repeating of steps (c)–(f) until said control word count equals an end count, defined to occur after information for all lines desired to be filled in on said form or forms have been provided.

* * * * *

UNITED STATES PATENT OFFICE
CERTIFICATE OF CORRECTION

Patent No. 4,080,659      Dated March 21, 1978

Inventor(s) Joseph P. Francini

It is certified that error appears in the above-identified patent and that said Letters Patent are hereby corrected as shown below:

column 3, line 63
"WR STB" should be --WT STB-- column 4, line 2
"WR STB" should be --WT STB-- column 8, line 10
"WD STB" should be --WT STB-- column 8, line 14
"WD STB" should be --WT STB-- column 1, line 25
"replacable" should be
--replaceable-- column 12, line 19
"occurence" should be
--occurrence-- column 24, lines 19-20
"non-reptive" should be
--non-repetitive-- column 2, line 45
"." should be --;-- column 3, line 55
"this" should be --This-- column 4, line 29
"With" should be --with-- column 8, line 29
"then" should be --than-- column 9, lines 14-15
after "IN3," insert --are-- column 10, line 1
"switch 1" should be
--switch SW1-- column 10, line 8
"FIG, 5," should be
--FIG. 5,-- column 10, line 9
"in this-year" should be
--in the this-year-- column 10, Table I
all zeros in Table I should
be --∅-- column 14, line 28
"SW" should be --SW1-- column 14, line 48
"than" should be --that-- column 15, line 2
"work blocks" should be
--word blocks--

UNITED STATES PATENT OFFICE
CERTIFICATE OF CORRECTION

Patent No. 4,080,659　　　　　　　　　　　Dated March 21, 1978

Inventor(s) Joseph P. Francini

It is certified that error appears in the above-identified patent and that said Letters Patent are hereby corrected as shown below:

column 15, line 4
"work blocks" should be
--word blocks-- column 15, Table II, lines 19-20
"#2" should be --#2--, and
"#4" should be --#4-- column 16, line 55
"times" should be --lines-- column 17, line 13
"item/line." should be
--item/line key.-- column 19, lines 28-29
"sub-stracted" should be
--sub-tracted-- column 21, Table III
all zeros should be --∅-- column 21, line 58
"F2 and 12..." should be
--F2 is 12...-- column 21, line 59
"respresenting" should be
--representing-- column 23, line 49
"If then" should be
--It then-- column 27, line 20
"swtiches" should be
--switches-- column 28, line 1
"form of forms" should be
--form or forms--

Signed and Sealed this

Thirtieth Day of January 1979

[SEAL]

Attest:

RUTH C. MASON
*Attesting Officer*

DONALD W. BANNER
*Commissioner of Patents and Trademarks*